United States Patent [19]
Takashimizu et al.

[11] Patent Number: 6,040,923
[45] Date of Patent: Mar. 21, 2000

[54] TRANSFER CONTROL APPARATUS FOR OPTICAL IMAGE READING APPARATUS

[75] Inventors: Yoshihiro Takashimizu; Yoshio Tabata, both of Kawasaki, Japan

[73] Assignee: Fujitsu Limited, Kawasaki, Japan

[21] Appl. No.: 08/873,024

[22] Filed: Jun. 11, 1997

[30] Foreign Application Priority Data

Nov. 21, 1996 [JP] Japan .................................. 8-310407

[51] Int. Cl.⁷ .................. H04N 1/04; B65H 7/12
[52] U.S. Cl. .................. 358/498; 358/496; 358/494; 358/474; 271/262
[58] Field of Search .................. 358/498, 496, 358/494, 474, 449; 250/204, 208.1; 271/227, 262, 256

[56] References Cited

U.S. PATENT DOCUMENTS

| | | | |
|---|---|---|---|
| 4,996,604 | 2/1991 | Ogawa et al. | 358/474 |
| 5,067,704 | 11/1991 | Tsuihiji et al. | 271/262 |
| 5,131,648 | 7/1992 | Ito | 271/262 |
| 5,530,790 | 6/1996 | Ueyama | 395/102 |
| 5,574,274 | 11/1996 | Rubley et al. | 250/208.1 |
| 5,666,191 | 9/1997 | Hasegawa et al. | 358/401 |
| 5,681,036 | 10/1997 | Wakahara et al. | 271/227 |
| 5,699,165 | 12/1997 | Suzuki et al. | 358/474 |
| 5,715,071 | 2/1998 | Takashimizu et al. | 358/498 |
| 5,732,165 | 3/1998 | Suzuki et al. | 382/305 |

*Primary Examiner*—Joseph Mancuso
*Assistant Examiner*—Hien Truong
*Attorney, Agent, or Firm*—Armstrong, Westerman, Hattori, McLeland, & Naughton

[57] ABSTRACT

A transmission-type sensor and a reflection-type sensor are provided for detecting paper at the same position of a transfer path, and a sensor mode used according to kinds, printed conditions, and the like of the paper is selected. A transmission-type sensor processing unit and a reflection-type sensor processing unit are provided according to the transmission-type sensor and reflection-type sensor. The paper pass detection unit detects presence of paper, and decides presence of double-feed for the second and later sheets of paper based on detection information of the first sheet of paper.

34 Claims, 35 Drawing Sheets

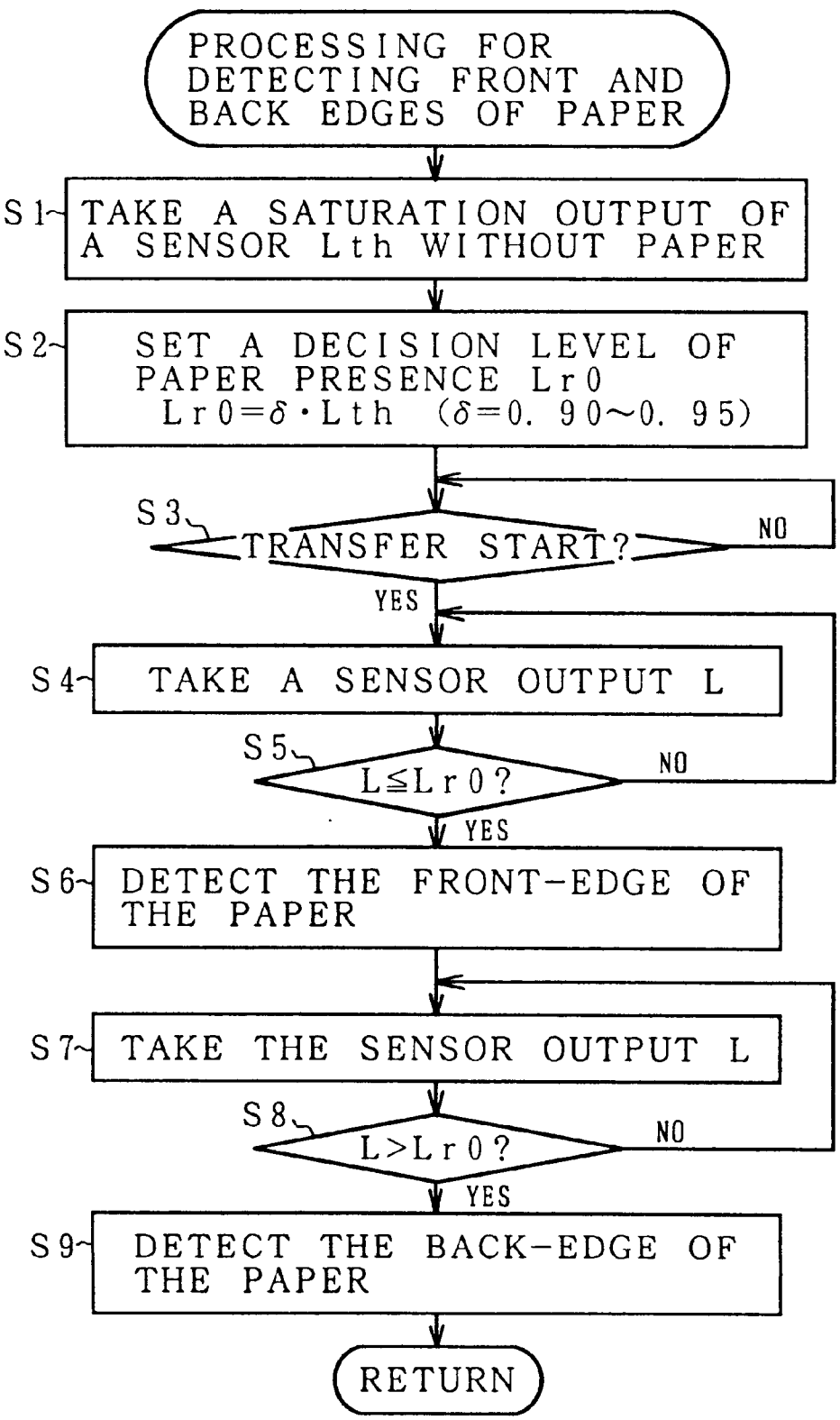

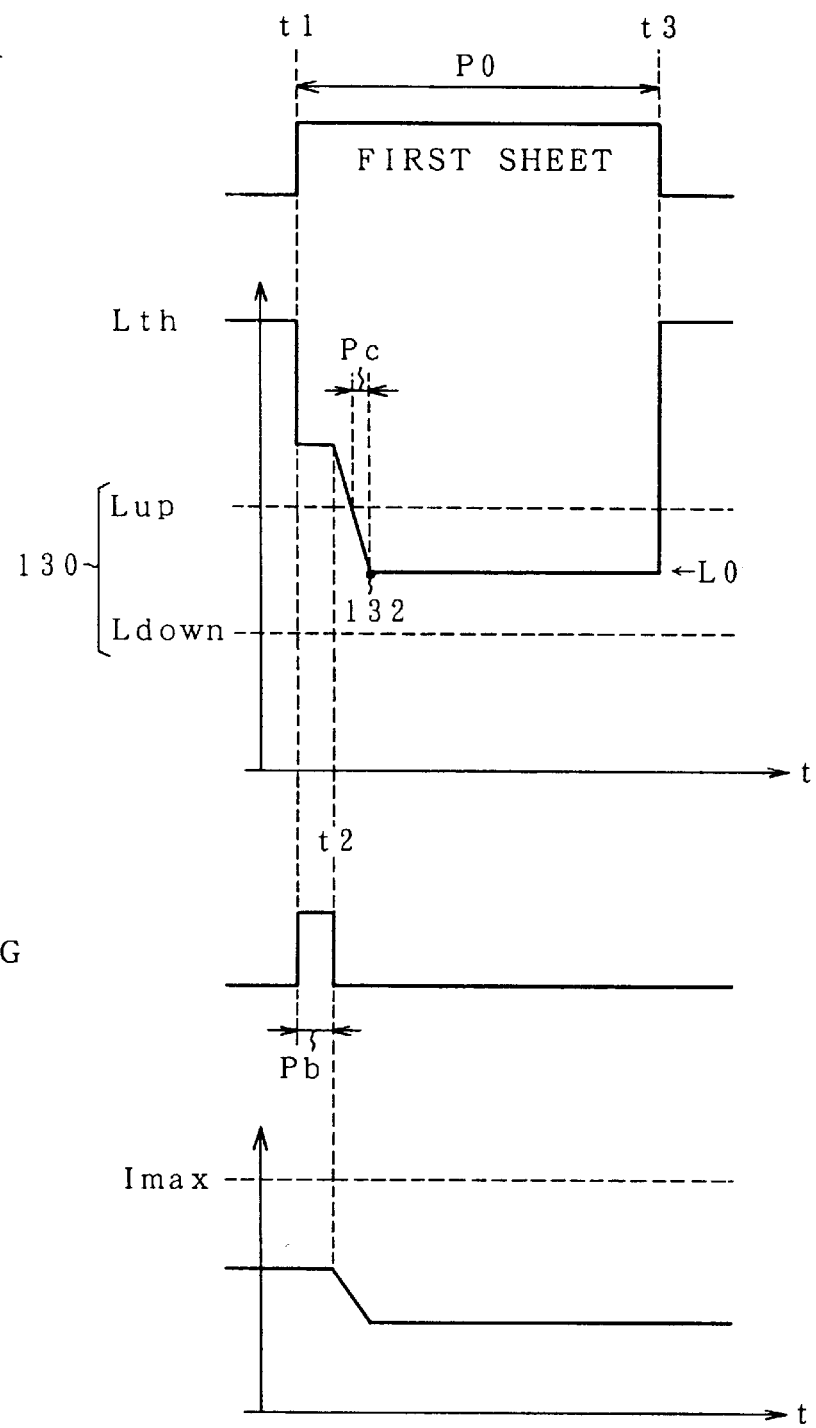

DETECTION OF PAPER PRESENCE

SENSOR OUTPUT L

CONTROL INHIBITING TIMER

LIGHT EMISSION CURRENT I

SENSOR OUTPUT

LIGHT EMISSION CURRENT (USED) PAPER 18

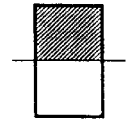
FIG. 14A
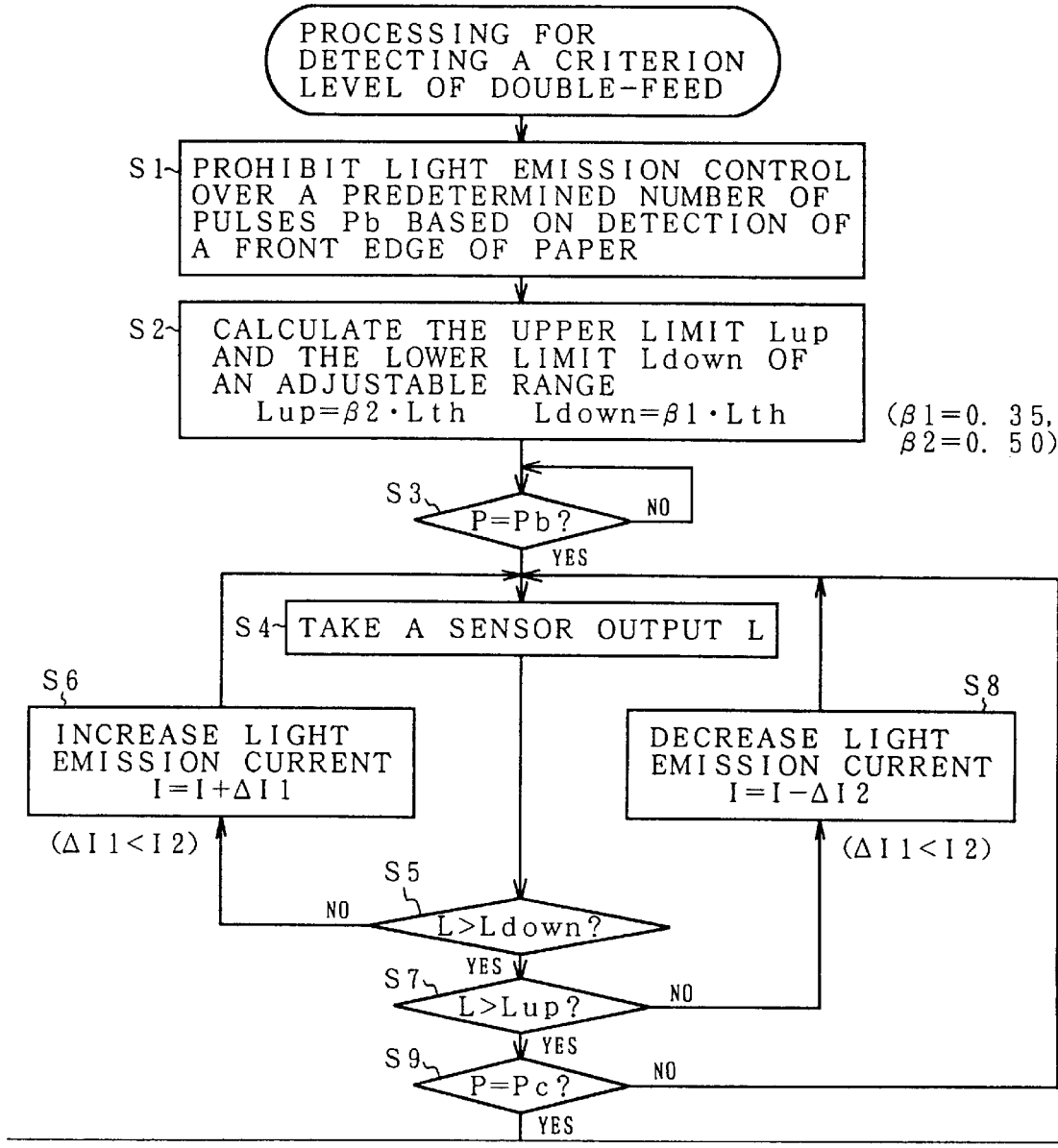

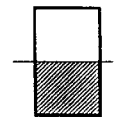
FIG. 14B
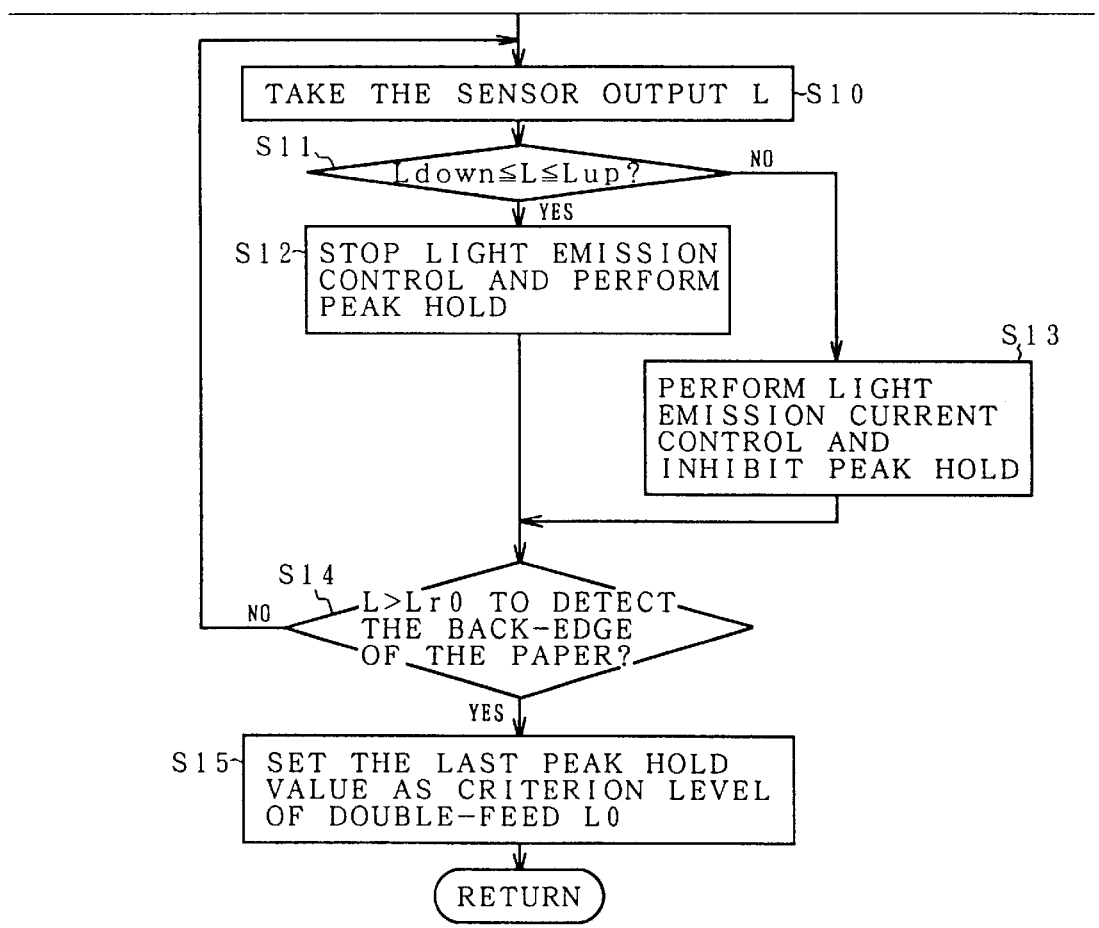

FIG. 15A DETECTION OF PAPER PRESENCE
FIG. 15B SENSOR OUTPUT L
FIG. 15C DECISION INHIBITING GATE SIGNAL
FIG. 15D SIGNAL FOR THE NUMBER OF PULSES PASSING THROUGH PAPER
FIG. 15E DECISION GATE SIGNAL
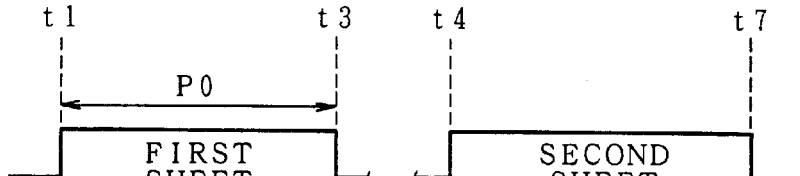
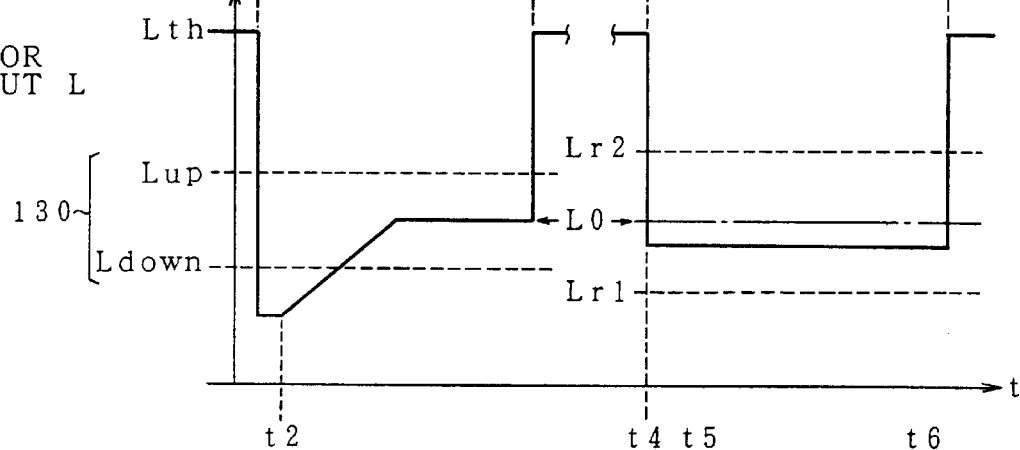
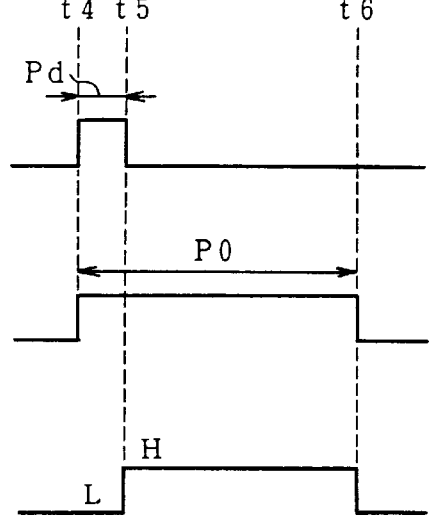

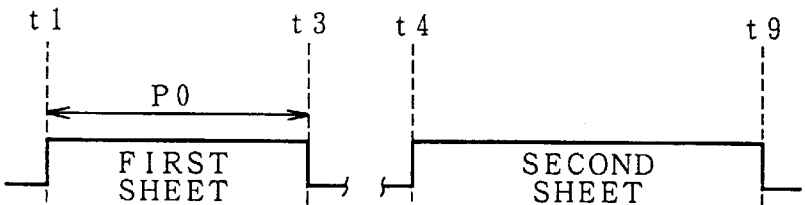
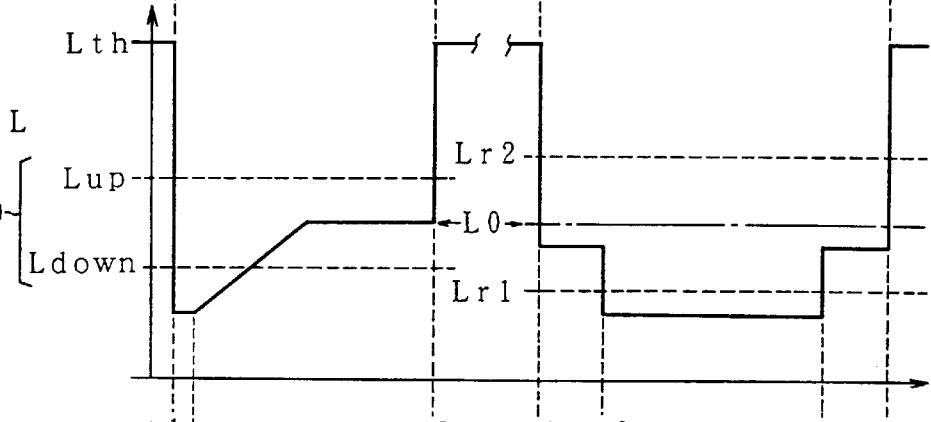
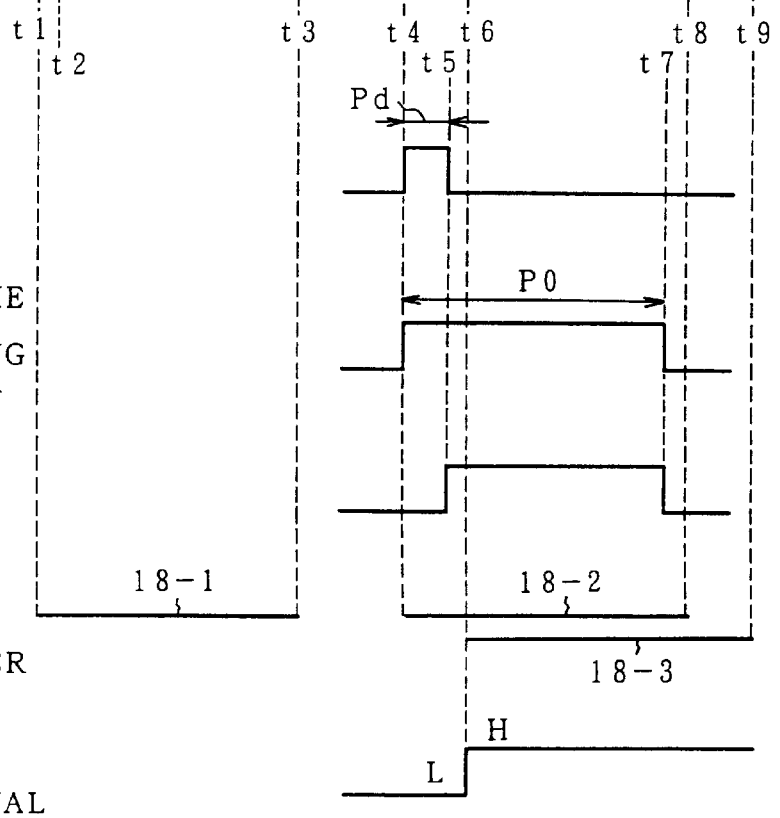
FIG. 16A DETECTION OF PAPER PRESENCE
FIG. 16B SENSOR OUTPUT L
FIG. 16C DECISION INHIBITING GATE SIGNAL
FIG. 16D SIGNAL FOR THE NUMBER OF PULSES PASSING THROUGH PAPER
FIG. 16E DECISION GATE SIGNAL
FIG. 16F STATUS IN PAPER TRANSFER
FIG. 16G DOUBLE-FEED DECISION SIGNAL

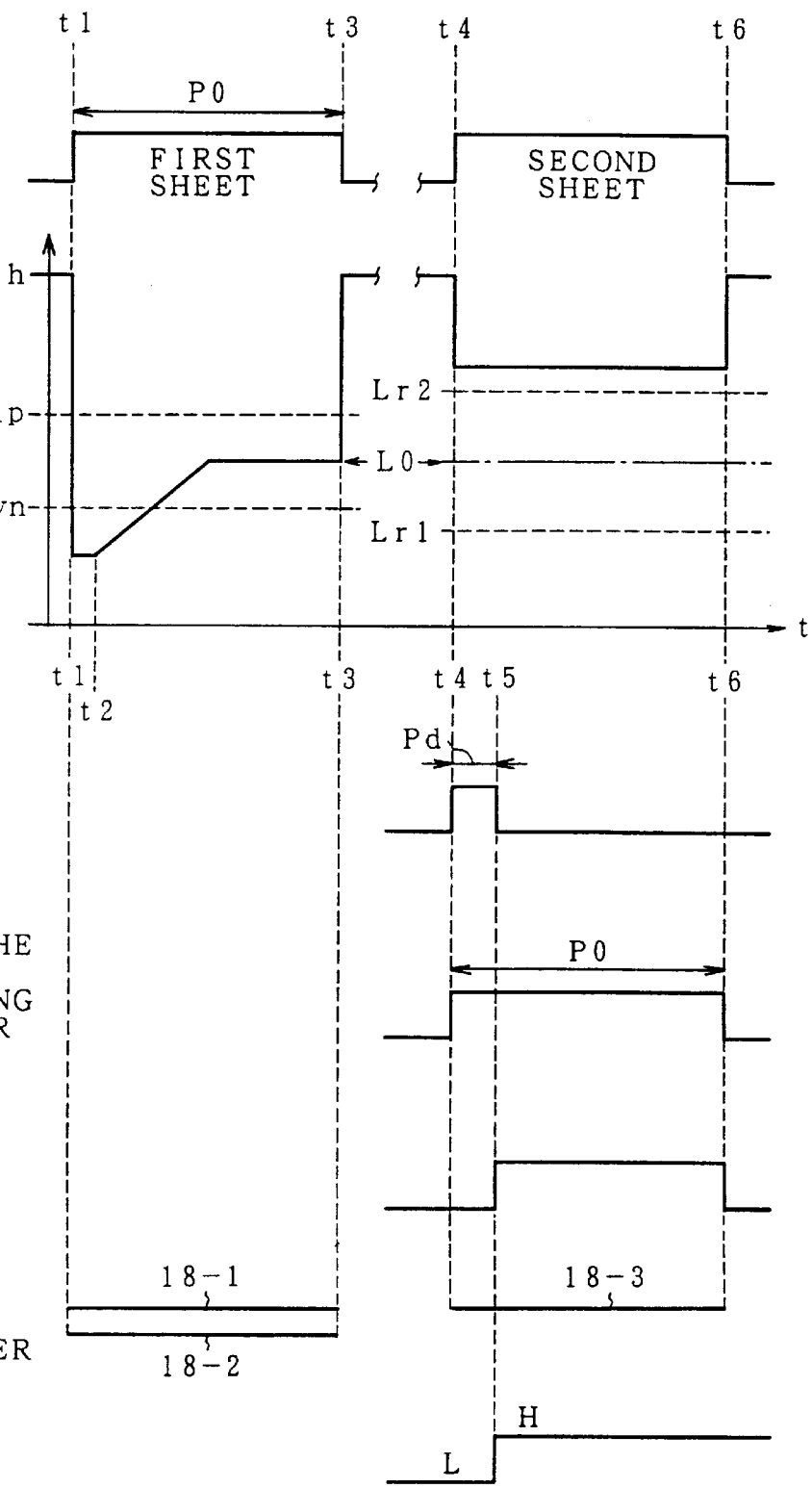

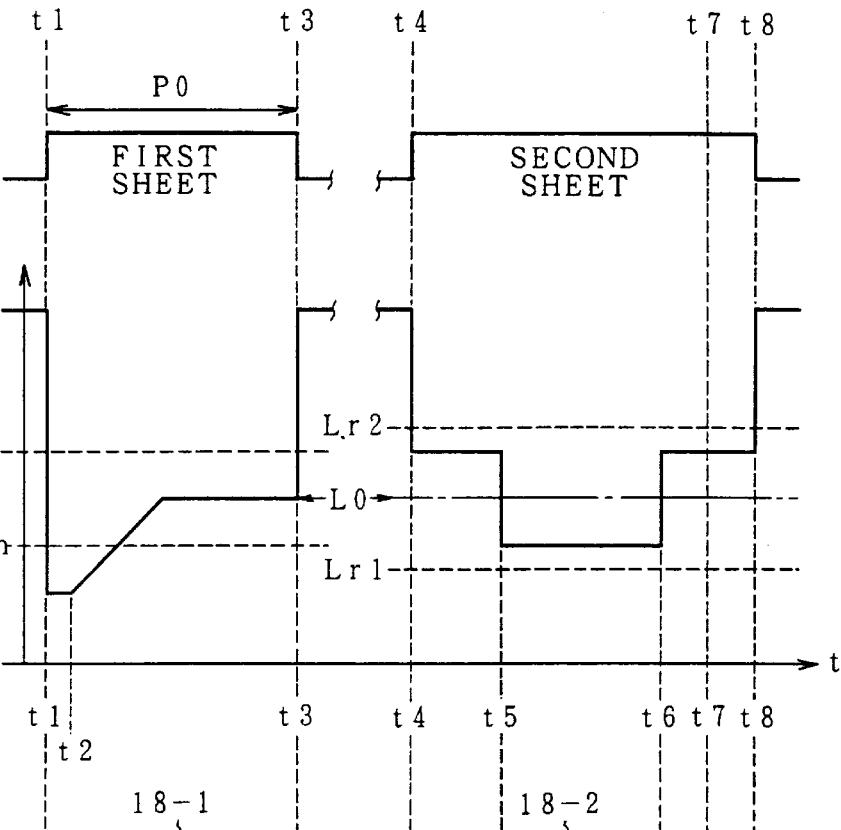

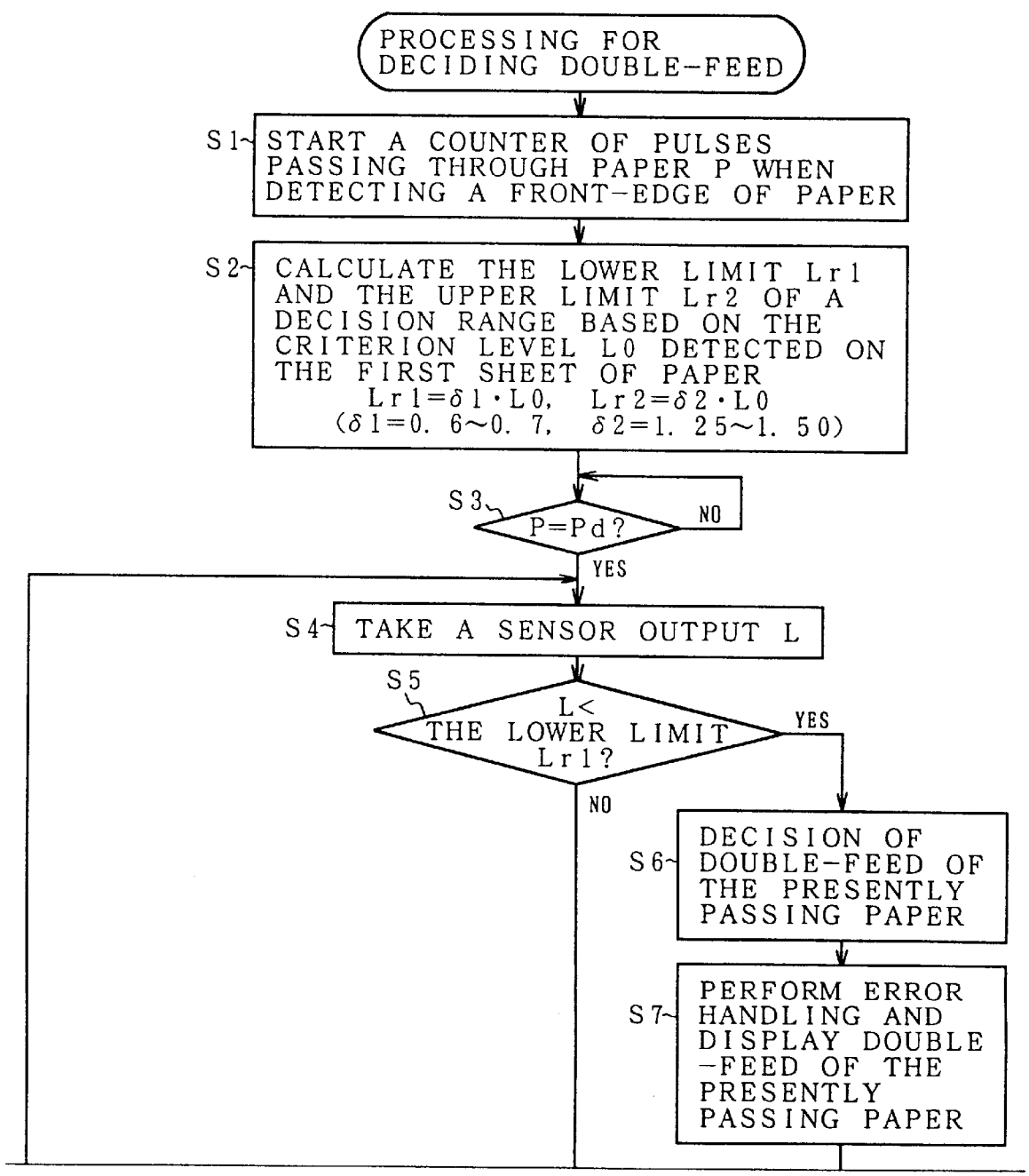

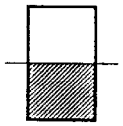
FIG. 19B
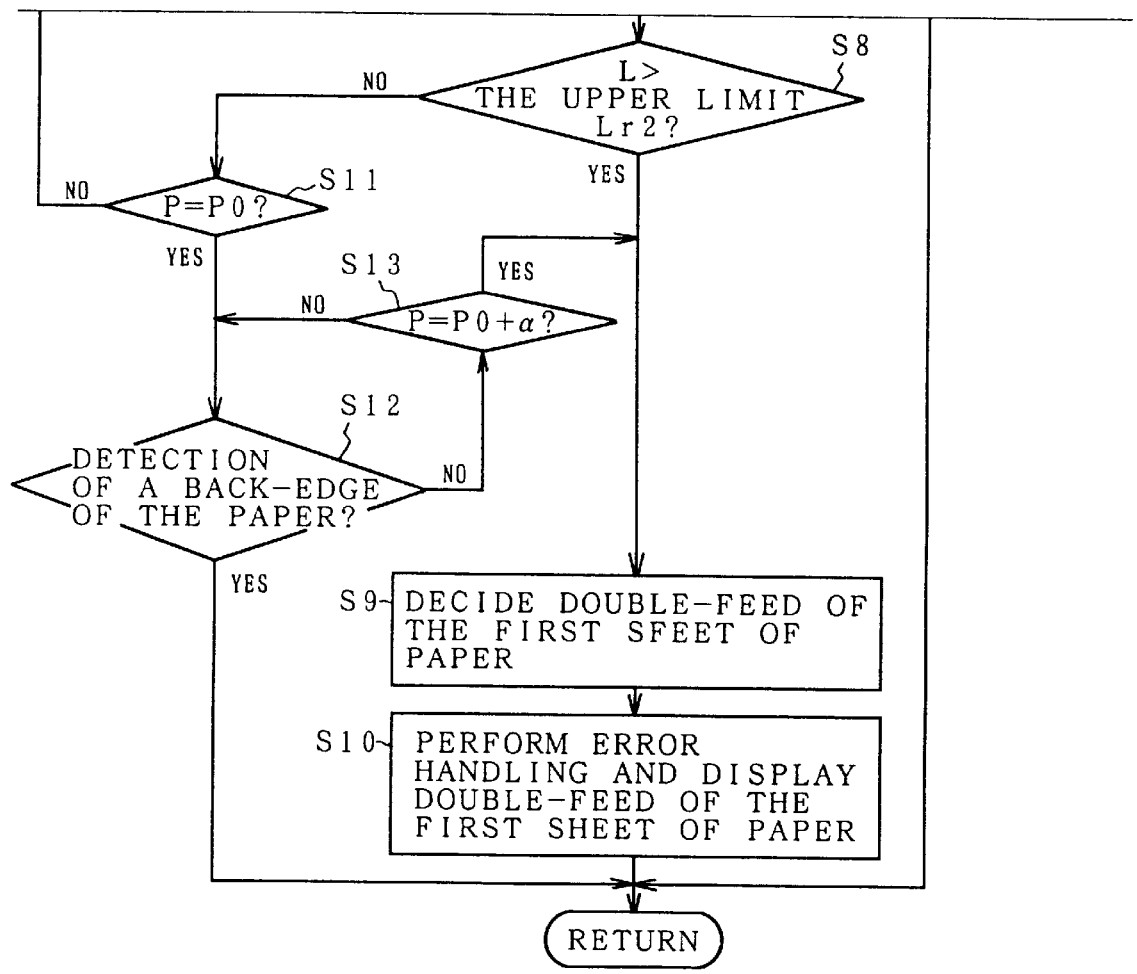

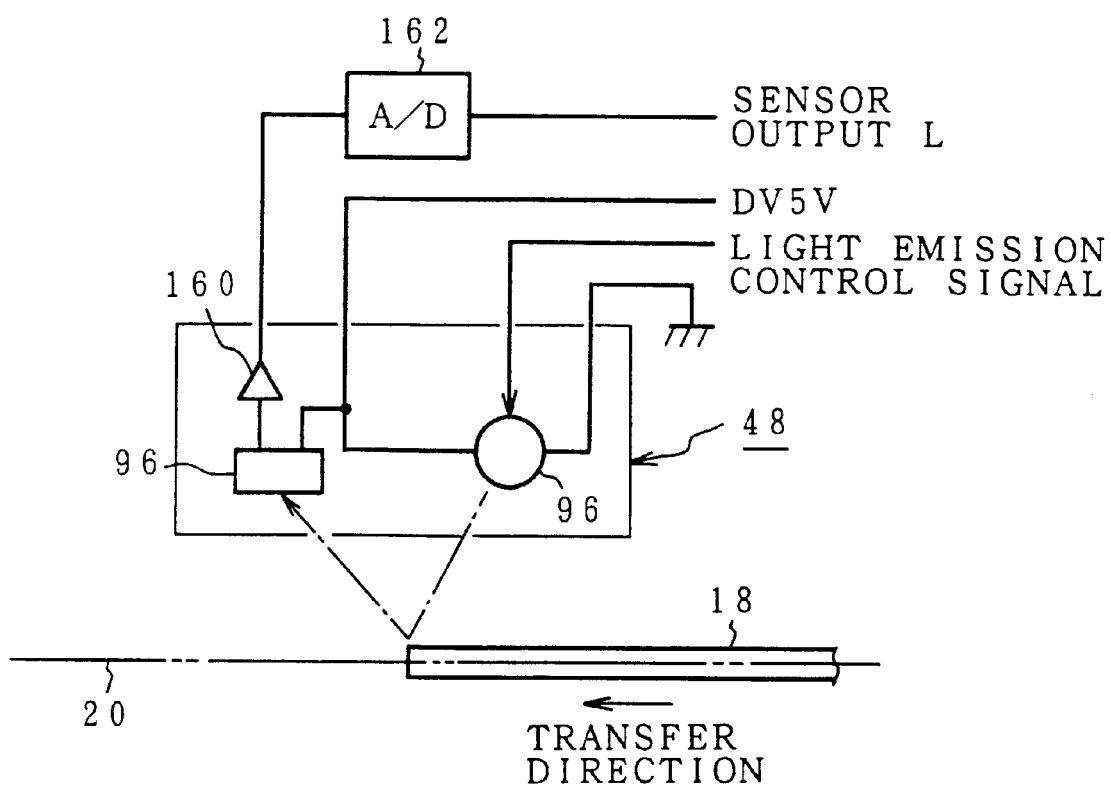

| DIFFERENTIAL VALUE | OFFSET VALUE |
|---|---|
| $\Delta L1$ | $Pa1$ |
| $\Delta L2$ | $Pa2$ |
| $\Delta L3$ | $Pa4$ |
| $\Delta L4$ | $Pa5$ |
| ⋮ | ⋮ |
| $\Delta Ln$ | $Pan$ |

FIG. 25A

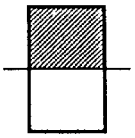

```
        ┌─────────────────────┐
        │ PROCESSING FOR      │
        │ DETECTING FRONT AND │
        │ BACK EDGES OF PAPER │
        └─────────────────────┘
                  ↓
S1 ─ TAKE A SENSOR OUTPUT L
                  ↓
S2 ─ L ≧ THE SLICE LEVEL S
     TO DETECT A FRONT-        — NO
     EDGE OF PAPER?
                  ↓ YES
S3 ─ MAKE A FRONT-EDGE COUNTER
     P1 START COUNTING PULSES
     PASSING THROUGH THE PAPER
                  ↓
S4 ─ P1 = Pe ?                 — NO
                  ↓ YES
S5 ─ LATCH THE SENSOR OUTPUT
     AS Lt AND CALCULATE THE
     DIFFERENTIAL (Lt−S)
                  ↓
S6 ─ REFER TO A TABLE WITH THE
     DIFFERENTIAL (Lt−S) AND
     THEREBY RESOLVE AN OFFSET
     CORRECTION VALUE Pa
                  ↓
S7 ─ CORRECT THE FRONT-EDGE
     COUNTER P1
           P1 = P1 + Pa
```

FIG. 28

| DIFFERENTIAL VALUE | OFFSET VALUE |
|---|---|
| $(dL/dt)1$ | $Pa1$ |
| $(dL/dt)2$ | $Pa2$ |
| $(dL/dt)3$ | $Pa4$ |
| $(dL/dt)4$ | $Pa5$ |
| ⋮ | ⋮ |
| $(dL/dt)n$ | $Pan$ |

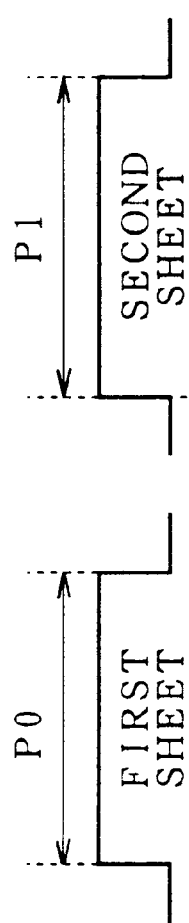
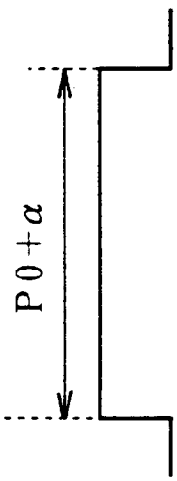
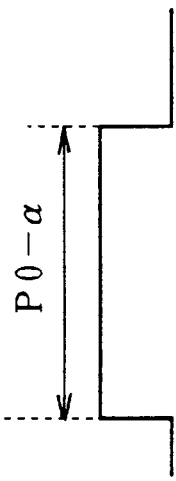
FIG. 29A  DETECTION OF PAPER
FIG. 29B  UPPER DECISION LIMIT
FIG. 29C  LOWER DECISION LIMIT

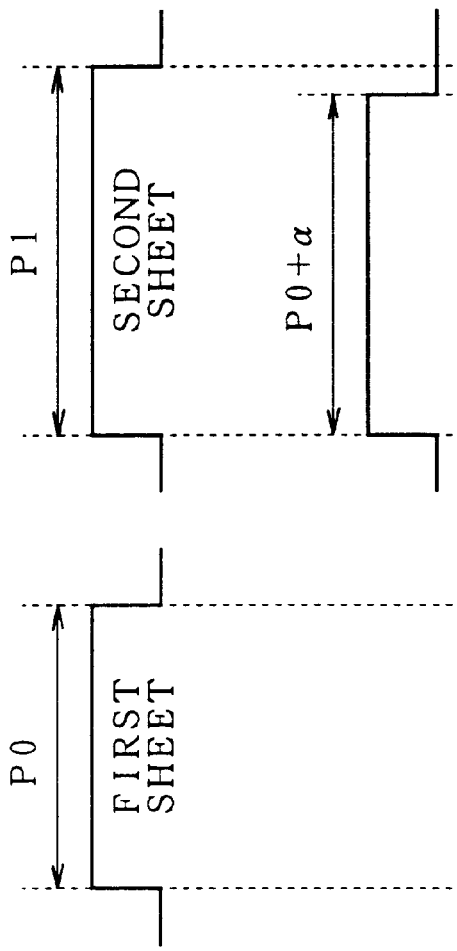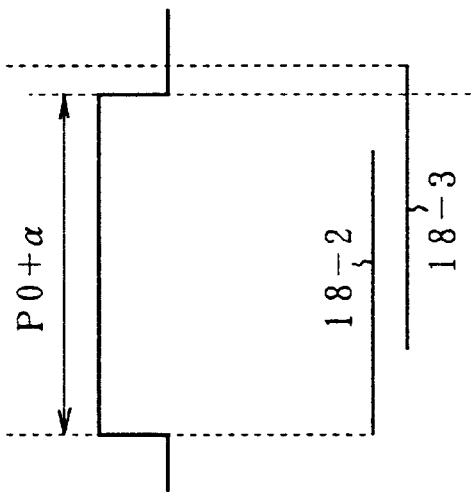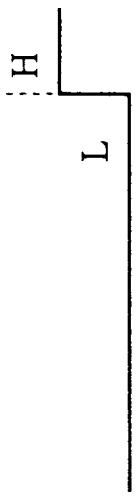

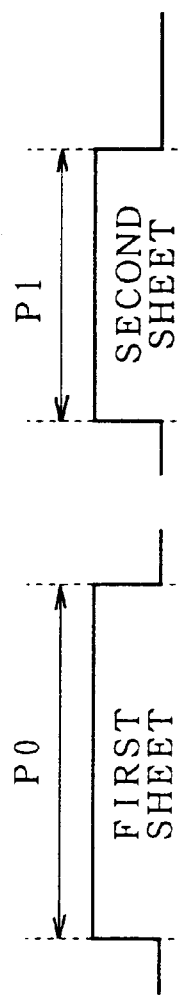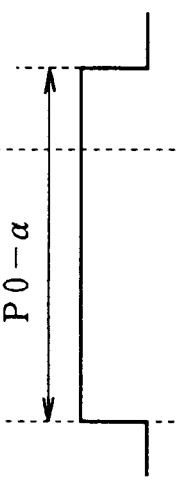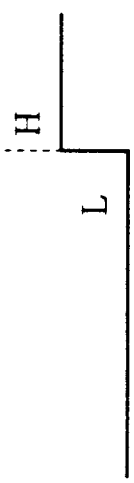

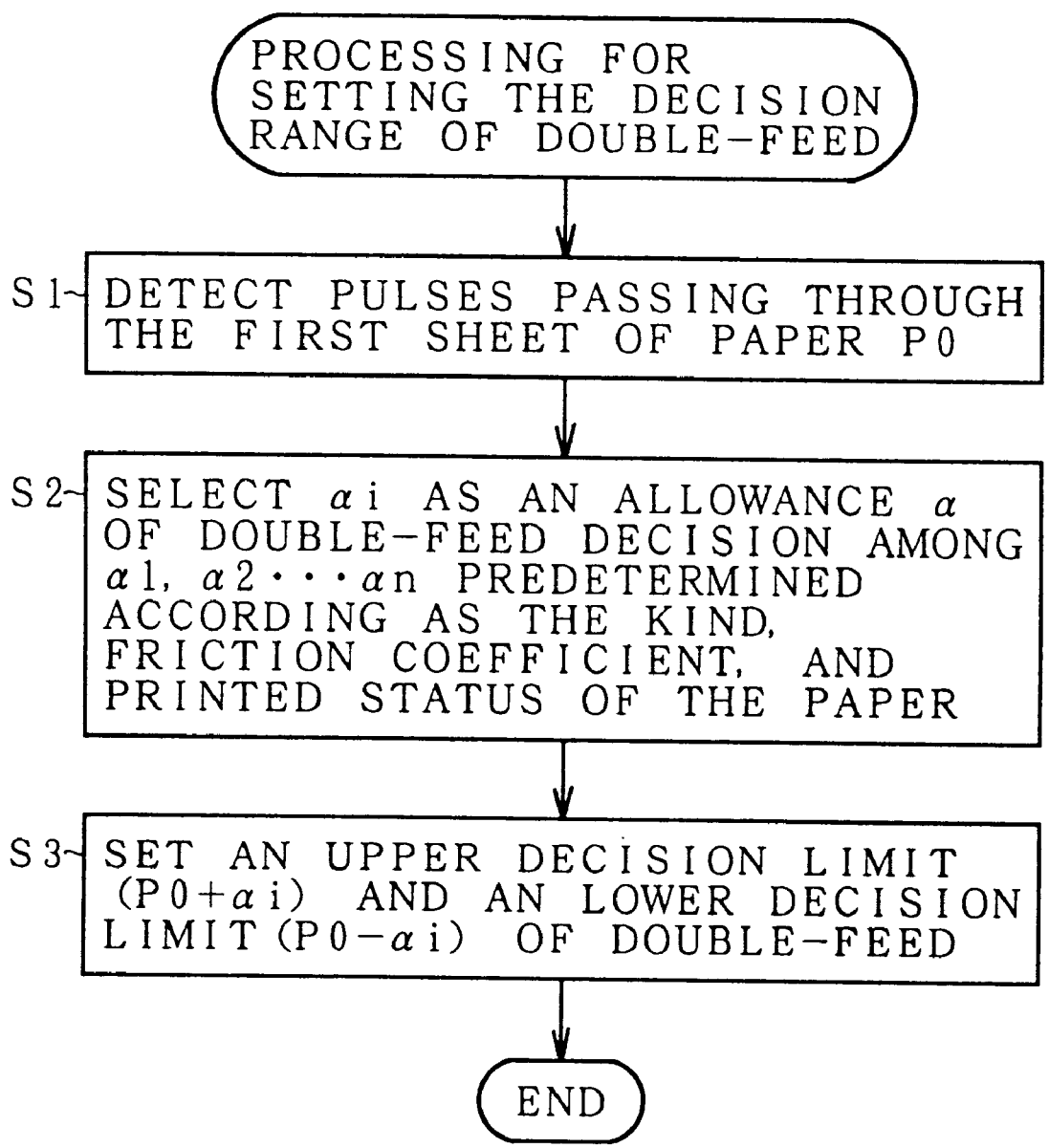

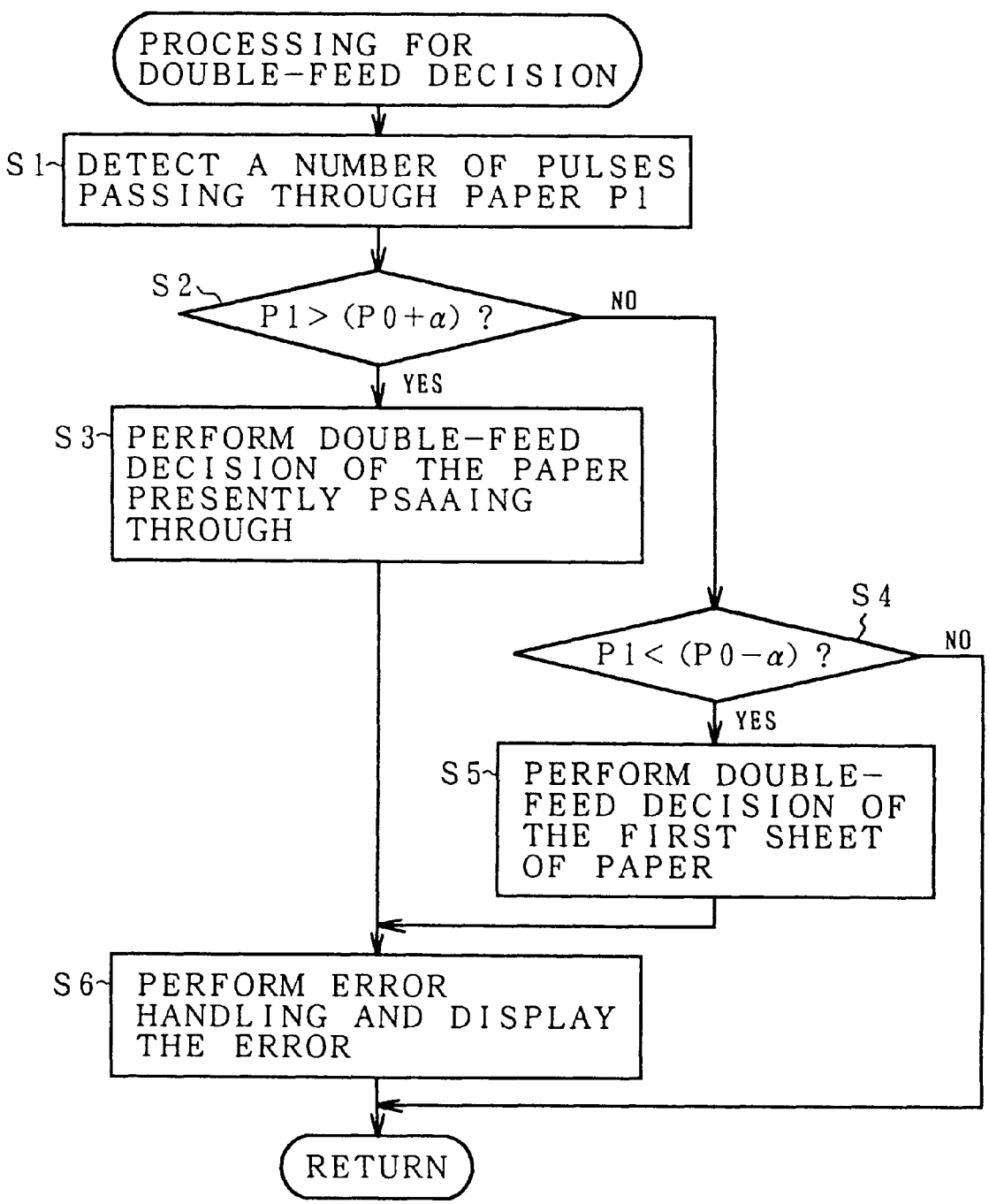

TRANSFER CONTROL APPARATUS FOR OPTICAL IMAGE READING APPARATUS

BACKGROUND OF THE INVENTION

1. Field of the Invention

The present invention relates to transfer control apparatus used for optical image reading apparatus that reads images on paper such as characters and graphics while transferring the paper continuously, and more particularly, to transfer control apparatus of optical image reading apparatus selectively using a transmission-type sensor and a reflection-type sensor so as to detect paper.

2. Description of the Related Art

Presently, copy machines, facsimiles, image readers, and the like perform read processing by paper transfer, which use various paper sensors for detecting paper. As for such sensors for detecting paper, transmission-type sensors and reflection-type sensors are generally used. A transmission-type sensor is composed of a light emitting diode (LED) and a phototransistor (PT) that are placed opposite each other with a paper transfer surface being put between the LED and PT. The sensor detects a quantity of transmitted light that is decreased by the paper screening light when the paper passes between them. Therefore, if the quantity of transmitted light becomes smaller than a predetermined value, the sensor detects paper presence. On the other hand, a reflection-type sensor has similarly an LED and a PT, and detects the quantity of light reflected from the surface of the paper by crossing the detection region of the PT with the optical axis of the LED. Then, if the quantity of reflected light becomes bigger than a predetermined value, the sensor detects paper presence.

However, since environments using paper sensors are diversified, it is necessary to detect special paper such as paper with superimposed printing, matte printing, and the like; paper having different thickness such as thin paper like tracing paper, post cards, and business cards; and further, deformed paper like folded or wrinkled paper. In addition to above conditions, it is also necessary to advance improvement such as higher detection speed and cost reduction. Here, the transmission-type sensor can comparatively easily detect paper although there is difference of output conditions due to printed conditions, thickness, kinds, deformation, and the like. However, the transmission-type sensor having the body combined with an LED and a PT is limited in its application because of its one body structure. Furthermore, regarding a transmission-type sensor separately having an LED and a PT, adjustment of opposed positioning is complicated. Moreover, since optical axes of both elements face each other across a paper transfer path, paper powder easily attaches to the lower element. Therefore, it has a problem that the output of the sensor becomes low in use instead of no paper, and hence, difference between a detection level without paper and a detection level in presence of thin paper which has large quantity of transmitted light becomes small, thereby making a mistake of detection.

In addition, in the reflection-type sensor, the light emitted by an LED and reflected by the surface of paper enters into a PT, the quantity of this reflected light being affected by surface conditions of paper as well as printed color and thickness of the paper. Concretely, according as presence of gloss of the printed paper surface, an output of the reflection-type sensor greatly changes even if the paper surface seems to be dark for human eyes. Although most of ink and toner for printing have gloss in usual printing, the output of the reflection-type sensor becomes very small for the paper printed with matting ink and toner, thereby adjustment and correction of the sensor output level being necessary for detecting such paper.

Further, an optical image reading apparatus detects a front and back edges of paper with paper sensors, which are used as reference positions at the time of read processing. Therefore, it is desirable that paper detection can be always done at the constant positions regardless of color and kinds of paper. However, in case there is a black area of printing at sensor's detection positions like front and back edges of paper, the position of paper, where the sensor output passes the slice level for paper detection, is different from that in the case that there is a completely blank area in printing at sensor's detecting position. For example, if light emission current flowing into an LED is set so that a sensor output may coincide with the slice level when a white paper edge is just under the sensor, the sensor output does not arrive at the slice level in case of the black paper edge until the paper edge fully enters into a sensor emission area. Hence, since this detection delay becomes a position error, as it is, in case of the black paper edge, this makes timing control of read processing in the downstream of paper transfer cause the position error.

Furthermore, conventionally, dedicated forms have been used, and parameters regarding characteristics of paper transfer have been limited, the parameters including paper thickness, size, base color, printed color, a printing method, edge treatment like a tear-off, a binding hole, a friction coefficient by coating, a reflection factor, and adsorption by static electricity. However, recently, these parameter limitations have been abolished, and hence, the kinds of paper have been diversified. Consequently, depending on paper, occurrence of jamming and double-feed during transfer has become a problem. In particular, double-feed of paper may become a cause of the jamming. Moreover, in image reading requiring sequential processing such as forms and slips, if the double-feed can not be detected, the data on paper to be read is different from the electronic information on a computer. Hence, the reliability of an entire operational system is decreased. Then, in a conventional method for detecting the double-feed, if, based on the designated thickness in the prohibited ranges of printing and writing on the forms which were designated when their user designed the forms, for example, the output change of the transmission-type sensor exceeds the predetermined value, the event is decided to be the double-feed. However, in case the paper out of specified items is transferred, the double-feed can not be detected. In order to prevent such double-feed, the most secure way is the single slip input that an operator inputs one sheet of paper at a time. However, the input method requires heavy work load, and increase of operational cost and decrease of processing speed can not be avoided.

SUMMARY OF THE INVENTION

According to the present invention, transfer control apparatus used for optical image reading apparatus is provided, the transfer control apparatus increasing the detection accuracy of paper detection and also properly corresponding to the double-feed through securely detecting the double-feed, for diversified paper.

First, the object of the present invention is paper transfer control apparatus used for optical image reading apparatus which detects paper transferred by a transfer mechanism using sensors and optically reads images such as characters and graphs. The paper transfer control apparatus according to the present invention comprises plural kind of sensors having different methods for detecting paper, a sensor mode selecting unit selecting one of the plural kind of sensors, and a paper detection processing unit performing paper detection processing peculiar to each sensor, based on a detection signal of the sensor selected by the sensor mode selecting unit. In this manner, by providing plural kind of sensors for detecting paper at the same position of a transfer path, and selecting a sensor to be used according to the diversified paper, the present invention can enhance the accuracy of paper detection and securely detect paper without the double-feed.

As for the plural kind of sensors used in the present invention, a transmission-type sensor and a reflection-type sensor are provided. In addition, as a paper detection processing unit, a transmission-type sensor processing unit is provided for the transmission-type sensor and a reflection-type sensor processing unit is for the reflection-type sensor. Each of the transmission-type sensor processing unit and the reflection-type sensor processing unit comprises a paper pass detection processing unit detecting information relating to paper pass from the change of sensor detection levels at the front and back edges of paper, and a double-feed detection processing unit detecting the double-feed, based on the sensor detection levels.

The paper pass detection processing unit of the transmission-type sensor processing unit sets a decision level of paper presence, Lr0 for detecting the paper presence between a sensor saturation output without paper, Lth and a sensor output at the time when the thinnest paper used in the apparatus is disposed. It is desirable that this decision level of paper presence, Lr0 is set within the range of 90%–95% of the sensor saturation output without paper, Lth. Owing to this, even in case of thin paper, decrease of the quantity of transmitted light at the time of passing the sensor that causes decrease of the sensor output that is at least lower than the decision level of paper presence, Lr0, can be obtained when the front-edge of the paper arrives directly below the sensor, and hence, the paper pass detection processing unit can securely detect the front and back edges of the paper.

The double-feed detection processing unit of the transmission-type sensor processing unit includes a criterion-level setting unit and a double-feed decision unit. Using control of light emission current, the criterion-level setting unit pulls a sensor output L in a criterion-level setting range having an upper limit Lup and a lower limit Ldown based on a quantity of light transmitted from a base color portion of paper when the first sheet of paper is transferred. Further, this unit detects the sensor output corresponding to the quantity of light transmitted from the base color portion of the paper within this criterion-level setting range and sets the output as a criterion level for double-feed decision, L0. Owing to this, regardless of presence of printing, change of color, coating, a binding hole, and the like, this unit sets the criterion-level for double-feed decision, L0 following the quantity of light transmitted from the base color portion of the paper that is always determined by the thickness and base color of the paper, within the criterion-level setting range where the quantity of transmitted light changes due to the double-feed. Naturally, this level L0 can be used for the double-feed decision for the second and later sheets of paper. The double-feed decision unit sets a lower decision limit Lr1 and upper decision limit Lr2 based on the criterion-level for double-feed decision, L0 that was set by the criterion-level setting unit. And, if the sensor output L becomes equal to or lower than the lower decision limit Lr1 when the second and later sheets of paper are transferred, this unit decides to be the double-feed of the paper presently being transferred. In addition, if the sensor output becomes equal to or larger than the upper decision limit Lr2 when the second and later sheets of paper are transferred, the unit decides to be the double-feed of the first sheet of paper. In this manner, the decision of double-feed is performed based on the criterion-level L0 that was obtained from the sensor output for the first sheet of paper actually transferred. Therefore, even if paper is diversified, the decision level of double-feed corresponding to the then paper is learned and set, and hence, the unit can detect the double-feed more securely. Of course, when the unit detects the double-feed, the unit stops drawing of the new sheet of paper from a hopper, discharges to a stacker the paper presently transferred, and thereafter stops the apparatus as error stop. At the same time, the unit performs error display of whether the double-feed arose at the first sheet of paper or the present one, and returns the double-fed paper to the hopper for retry. It is desirable that the criterion-level setting range set by the criterion-level setting unit is set in the range of 35%–50% of the sensor saturation output Lth. If the sensor output at the time when the front-edge of the paper passes is equal to or larger than the upper limit Lup, the criterion-level setting unit pulls the sensor output in the criterion-level setting range by decreasing the light emission current of the sensor. On the other hand, if the sensor output at the time when the front-edge of the paper passes is equal to or smaller than the lower limit Ldown, the criterion-level setting unit pulls the sensor output in the criterion-level setting range by increasing the light emission current of the sensor. In this case, the changing speed of the light emission current is made to be high if the light emission current is decreased, and the changing speed of the light emission current is made to be low if the light emission current is increased. Owing to this, even if the printed status is in that the quantity of light transmitted from the front-edge portion of the paper is different from the quantity of light transmitted from the base color portion of the paper, the sensor output can rapidly follow the quantity of light transmitted from the base color portion of the paper when the subsequent base color portion of the paper enters into the sensing area. In addition, the criterion-level setting unit inhibits control of the light emission current for pulling the sensor output in the criterion-level setting range from the time when the front-edge of the paper was detected to the time when the number of pulses passing through the paper reaches a predetermined value. Owing to this, this unit pulls the sensor output rapidly and stably in the criterion-level setting range at the base color portion of the paper except the portions of solid printing, seal attaching, and the like at the front-edge portion of the paper. Consequently, the unit prevents the detection error of double-feed due to the rapid change of the criterion-level. The criterion-level setting unit started the peak hold of the sensor output in the status of stopping the control of the light emission current when the sensor output was pulled continuously in the criterion-level setting range, and sets the peak hold value just before detecting the back-edge of the paper, as the criterion-level for double-feed decision, L0. Owing to this peak hold, the criterion-level following the quantity of light transmitted from the base color portion can be finally obtained without being affected by the change of the sensor output due to the printed conditions of the paper. Concretely, in case the quantity of light transmitted from the base color portion of the paper gradually changes, the sensor output value of the portion having the smallest quantity of light transmitted from the base color portion of the paper (the thinnest portion) is obtained by the peak hold, and is set as the criterion-level for double-feed decision, L0. The criterion-level setting unit restarts the control of the light emission current and also inhibits the peak hold if the sensor output goes out of the criterion-level setting range during the peak hold after the unit pulled the sensor output in the criterion-level setting range. Hence, the unit can accurately set the criterion-level corresponding to the base color portion of the paper without being affected by the sensor output going out of the criterion-level setting range due to solid printing, seal attaching, a binding hole, and the like on the paper. It is desirable that the double-feed decision unit sets the value of 60%–75% of the criterion-level L0 as the lower limit for double-feed decision, Lr1, and sets the value of 125%–150% of the criterion-level L0 as the upper limit for double-feed decision, Lr2. In addition, the double-feed decision unit sets as the decision period of the double-feed the period from the time when the front-edge of the paper was detected to the time when the number of pulses passing through the first sheet of paper, P0, which was obtained beforehand, is counted. During the period in this period when the first predetermined number of pulses passing through the paper, Pa is counted, the double-feed decision is inhibited. If the number of pulses passing through the paper from the time when the front-edge of the paper was detected exceeds the value, (P0+α) obtained by adding the first number of pulses passing through the paper, P0, which was obtained beforehand, and a predetermined error range α, the double-feed decision unit, further, decides to be the double-feed of the paper presently passing even if the sensor output is within the above-mentioned range of the lower limit Lr1 and the upper limit Lr2 for double-feed decision. Owing to this, even if the unit failed the double-feed decision based on the criterion-level L0, the unit can detect the double-feed more securely by deciding the double-feed from the status of abnormally long paper detection.

On the other hand, using a changing rate at the time of the sensor output reaching a predetermined slice level S after passing of the front-edge of the paper, a paper pass detection processing unit of the reflection-type sensor processing unit obtains an offset value (shifted quantity) from the front-edge of the paper, Pa when the sensor output reaches the slice level S. And, using the offset value Pa, the unit corrects a value used for decision at the time of the front-edge of the paper reaching a reading point in the downstream side. Owing to this, the shift of a detection point due to difference of thickness at a front-edge of the paper and printed conditions can be prevented. The relation between the changing rate and the offset value Pa is provided beforehand as table information. As the changing rate at the time of the sensor output reaching the predetermined slice level S after the front-edge of the paper passed, the differential, (Lt–S) is used, the differential being obtained by subtracting a predetermined slice level S from the sensor output Lt at the time when the predetermined number of pulses passing through the paper is counted from the time when the sensor output reached the slice level S. In addition, as the changing rate, a derivative value, dL/dt may be used, the derivative value being obtained by derivation of the sensor output at the time when the sensor output reaches the slice level S. As for correction by the paper pass detection processing unit, at the time when the sensor output increases to the predetermined slice level S after the front-edge of the paper passed, the unit makes a front-edge counter P1 start counting pulses passing through the paper. Furthermore, the unit corrects the count by adding the offset correction value Pa, and the unit decides arrival of the front-edge of the paper to the reading point when the counted value of the front-edge counter P1 after this correction reaches the predetermined number of pulses passing through the paper, P0 from the sensor position to the reading point. As for correction of back-edge detection of the paper, at the time when the sensor output decreases to the predetermined slice level S just before the back-edge of the paper passes, the unit makes a back-edge counter P2 start counting pulses passing through the paper. Furthermore, the unit corrects the count by subtracting the offset correction value Pa, and the unit decides arrival of the back-edge of the paper to the reading point when the counted value of the back-edge counter P2 after this correction reaches the predetermined number of pulses passing through the paper, P0 from the sensor position to the reading point. The double-feed detection processing unit of the reflection-type sensor processing unit has a decision range setting unit and a double-feed decision unit. The decision range setting unit sets an upper limit (P0+α) and the lower limit (P0–α) by adding and subtracting a predetermined error range α to/from a number of pulses passing through the paper from the front-edge of the paper to the back-edge, P0, which were detected at the time when the first sheet of the paper was transferred. If the counted value of pulses passing through the paper at the time when the second or later sheet of paper is transferred exceeds the upper limit (P0+α), the double-feed decision unit decides to be the double-feed of the paper presently passing. And, if the counted value becomes smaller than the lower limit (P0–α), the unit decides to be the double-feed of the first sheet of paper. Further, it is desirable that the decision range setting unit sets the error allowance α to be variable, if necessary. Furthermore, the present invention also provides paper transfer control apparatus using a transmission-type sensor or a reflection-type sensor independently as a transfer sensor. In this case, the structure of the apparatus is the same as the structure peculiar to each sensor in the case that the transmission-type sensor and the reflection-type sensor are selectively used.

The above and other objects, features, and advantages of the present invention will become more apparent from the following detailed description with reference to the drawings.

BRIEF DESCRIPTION OF THE DRAWINGS

FIG. 10 is a flow chart showing detection processing of front and back edges of paper used by the paper pass detection processing unit for the transmission-type sensor shown in FIG. 5;

FIGS. 11A–11D are explanatory drawings of criterion-level setting processing used by a criterion-level setting unit for the transmission-type sensor shown in FIG. 5 in case of a low sensor output;

FIGS. 14A–14B are flow charts of criterion-level setting processing used by the criterion-level setting unit for the transmission-type sensor shown in FIG. 5;

FIGS. 15A–15E are explanatory drawings of decision processing used by a double-feed decision unit for the transmission-type sensor shown in FIG. 5;

FIGS. 16A–16G are explanatory drawings of decision processing used by the double-feed decision unit for the transmission-type sensor shown in FIG. 5 in case of double-feed arising at the second sheet of paper;

FIGS. 17A–17G are explanatory drawings of decision processing used by the double-feed decision unit for the transmission-type sensor shown in FIG. 5 in case of double-feed arising at the first sheet of paper;

FIGS. 18A–18E are explanatory drawings of another decision processing used by the double-feed decision unit for the transmission-type sensor shown in FIG. 5 in the case that the unit can not decide to be the double-feed based on the criterion-level;

FIGS. 19A–19B is a flow chart of the decision processing used by the double-feed decision unit for the transmission-type sensor shown in FIG. 5;

FIG. 20 is an explanatory drawing of the reflection-type sensor according to the present invention;

FIGS. 25A–25B is a flow chart of paper detection and offset correction using a differential value obtained by the paper pass detection processing unit for the reflection-type sensor shown in FIG. 5;

FIG. 28 is an explanatory drawing of table information for obtaining an offset value based on a derivative value shown in FIG. 27;

FIGS. 29A–29C are explanatory drawings of setting processing used by a decision range setting unit for the reflection-type sensor shown in FIG. 5;

FIGS. 30A–30D are explanatory drawings of decision processing used by a double-feed decision unit for the reflection-type sensor shown in FIG. 6 in case of double-feed arising at the second sheet of paper;

FIGS. 31A–31D are explanatory drawings of decision processing used by the double-feed decision unit for the reflection-type sensor shown in FIG. 6 in case of double-feed arising at the first sheet of paper;

FIG. 32 is a flow chart of setting processing used by a decision range setting unit for the reflection-type sensor shown in FIG. 5; and FIG. 33 is a flow chart of decision processing used by the double-feed decision unit for the reflection-type sensor shown in FIG. 5.

DETAILED DESCRIPTION OF THE PREFERRED EMBODIMENT

Configuration and Functions of Apparatus

Figure 1:
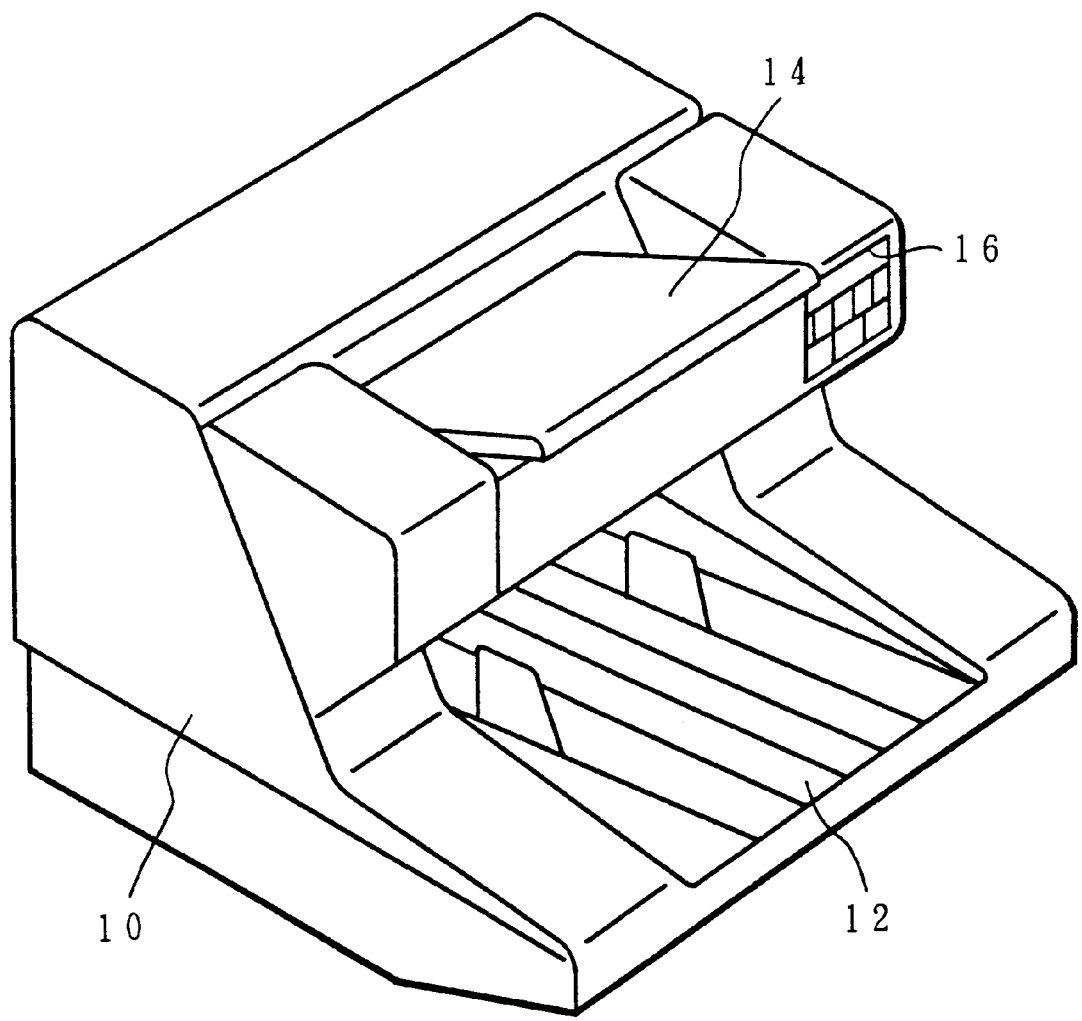
FIG. 1 is an explanatory drawing of optical image reading apparatus according to the present invention.

FIG. 1 shows appearance of optical image reading apparatus where the transfer control according to the present invention is applied. This optical image reading apparatus comprises a hopper 12 containing paper, which will be read, in the lower front of an apparatus body 10, and a stacker 14 for discharging the paper, which has been already read, in the upper side. In addition, in the upper right side of the front of the apparatus body 10, an operation display panel 16 is provided, and various operation switches and displays are provided which are necessary for read operations.

Figure 2:
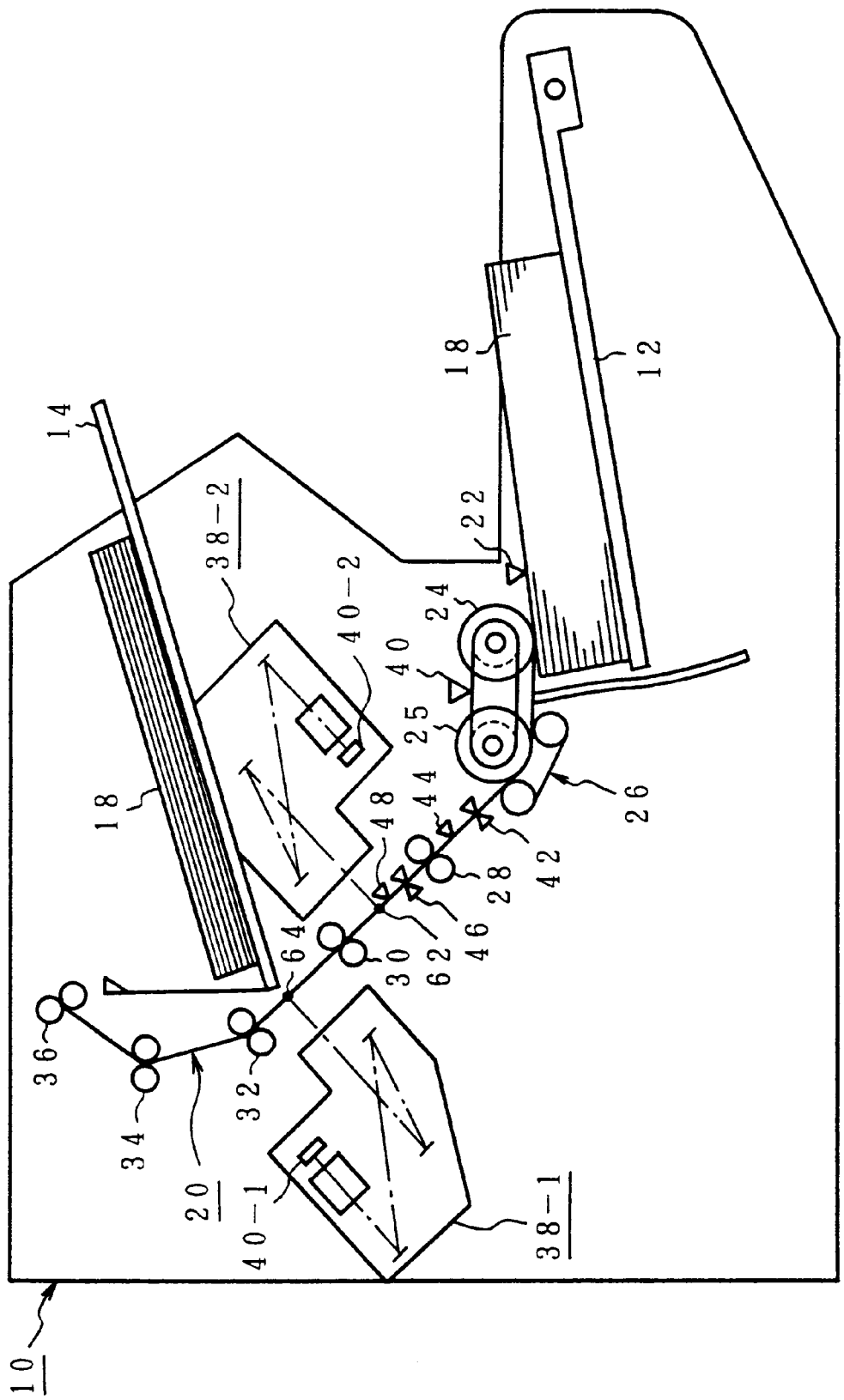
FIG. 2 is an explanatory drawing of the internal structure of the apparatus shown in FIG. 1.

FIG. 2 shows the internal structure of the optical image reading apparatus shown in FIG. 1, and in particular, shows a paper transfer system. In addition, FIG. 3 shows a paper transfer path 20 from the hopper 12 to the stacker 14 taken out from the apparatus shown in FIG. 2, and in particular, shows sensor layout easy to understand, whose contents are the same as those in FIG. 2.

Figure 3:
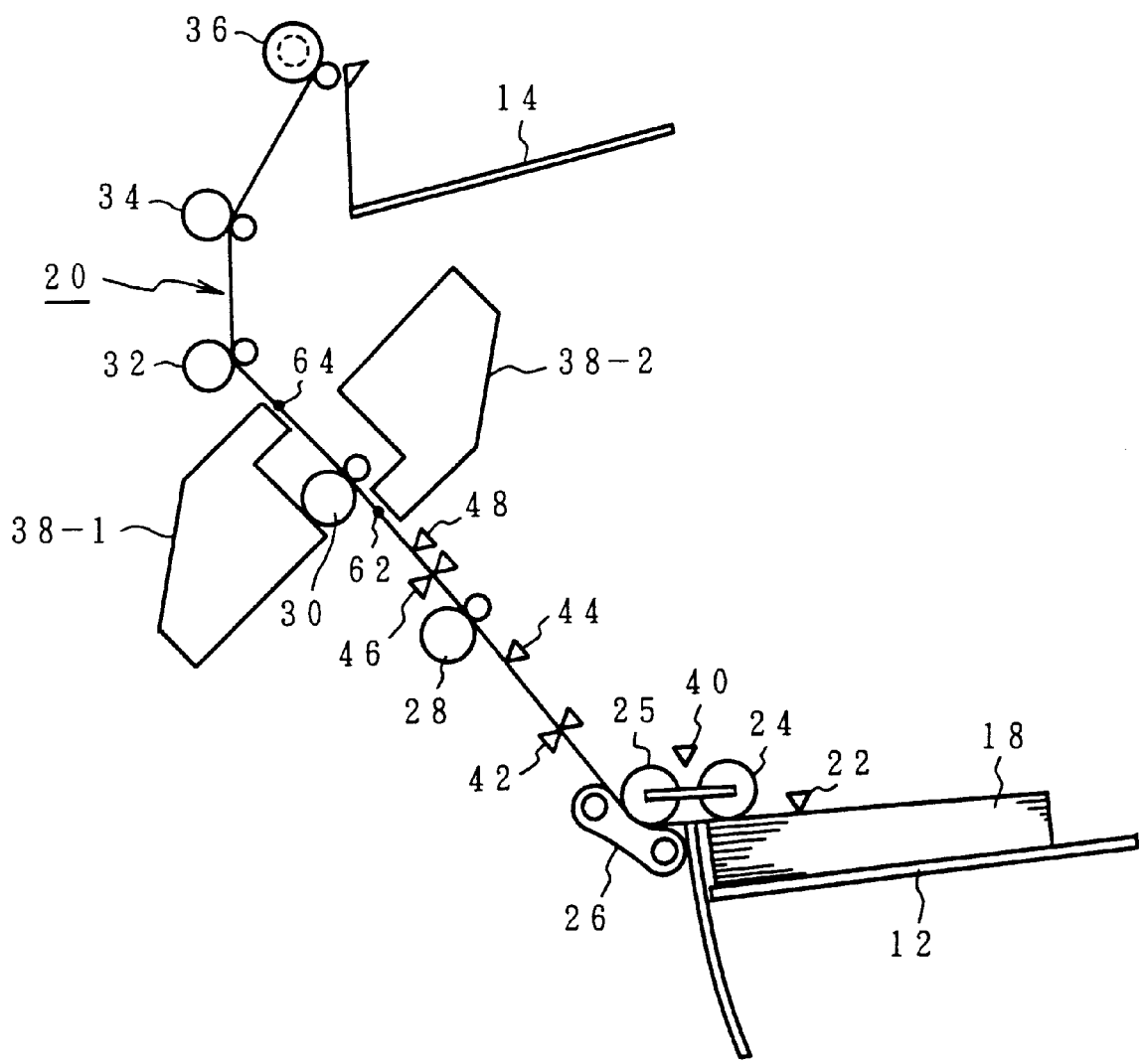
FIG. 3 is an explanatory drawing of a paper transfer mechanism and sensors taken out from the apparatus shown in FIG. 2.

In FIGS. 2 and 3, a plural sheet of paper to be read, 18 is piled in the hopper 12 facedown. The paper 18 is fed into the paper transfer path 20 by a paper feed roller 24. After the paper feed roller 24, a separation roller 25 is provided, and a belt pulley 26 is located at the opposite side of the separation roller 25. After the separation roller 25 on the paper transfer path 20, transfer rollers 28, 30, 32, 34, and 36 are located sequentially. Each of the transfer rollers 28, 30, 32, 34, and 36 is a drive roller rotated by a separate stepper motor, and a separate idle roller is located in the opposite side of each transfer roller. Midway of the paper transfer path 20, a face reading unit 38-1 and a back-side reading unit 38-2 are located in the opposite side of each other across the paper transfer path 20. The face reading unit 38-1 incorporates a line CCD 40-1, optically reads an image on the surface of the paper 18 passing a reading point 62 on the paper transfer path 20, converts the image into an electric signal, and finally generates image data. Similarly, the back-side reading unit incorporates a line CCD 40-2, optically reads an image on the back-side of the paper 18 passing a reading point 62 on the paper transfer path 20, and converts the image into image data. Since the usual paper 18 has printed images such as characters and graphs on its face, an image reading operation is performed by the face reading unit 38-1. On the other hand, in case the paper 18 has images printed on both of the face and back-side, a printing unit (not shown) prints a marker that is erasable before the reading point 62 and designates back-side reading. On the basis of this marker, the back-side reading unit 38-2 automatically reads the images on the back-side of the paper at the reading point 62. The paper 18 whose images were read during transfer on the paper transfer path 20 is discharged to the stacker 14. The paper transfer path 20 is folded back upward in the stacker 14 side. Owing to this, the paper 18 fed into the paper transfer path 20 facedown from the hopper 12 is piled faceup on the stacker 14 since the paper 18 becomes faceup when it is discharged from the transfer roller 36 to the stacker 14. Owing to this, the paper 18 can be discharged on the stacker 14 in the same sequence as on the hopper 12, and hence, it is not necessary to change the sequence of the paper 18 taken out from the stacker 14. On such path from the hopper 12 to the stacker 14 through the paper transfer path 20, a plurality of sensors is provided. First, the hopper 12 has an empty sensor 22, which detects presence of the paper 18 on the hopper 12. Between the paper feed roller 24 and separation roller 25, a paper feed sensor 40 is provided, which detects paper feed conditions of the paper 18 driven by the paper feed roller 24. After the separation roller 25, a transfer sensor 42 is provided. When the transfer sensor 42 detects a front-edge of the paper 18, driving by the paper feed roller 24 is isolated, and driving by the separation roller 25 is enabled. Therefore, the paper 18 on the hopper 12, first, is driven by the paper feed roller 24 and pulled into the paper transfer path 20. Next, when the front-edge of the paper reaches the position of the transfer sensor 42, driving by the paper feed roller 24 is switched to driving by the separation roller 25, and hence, this prevents double-feed of the paper 18 mechanically. Following the transfer sensor 42, a size sensor 44 is provided. The size sensor 44 detects a paper size such as B5, A4, B4, and A3 from the width of the paper fed into the paper transfer path 20. Reading widths of the line CCDs 40-1 and 40-2 of the face reading unit 38-1 and back-side reading unit 38-2 are set by this size detection using the paper width. Between the drive roller 28 and the reading point 62, a transmission-type sensor 46 and a reflection-type sensor 48, which are used for transfer control according to the present invention, are provided. In the transfer control according to the present invention, by operating a sensor mode selection switch according to a kind of the paper 18, one of sensor processing modes is selected, the processing modes including a processing mode by the transmission-type sensor and that by the reflection-type sensor. The transmission-type sensor 46 or reflection-type sensor 48 detects the front-edge of the paper, and controls reading start timing of the face reading unit 38-1 and the back-side reading unit 38-2 by counting transfer pulses until their numbers reach the respectively predetermined numbers from the detection point of the front-edge of the paper to the reading points 62 and 64. In addition, the transmission-type sensor 46 or reflection-type sensor 48 detects the back-edge of the paper, and similarly, decides arrival of the back-edge of the paper by counting transfer pulses until their numbers reach the respectively predetermined numbers to the reading points 62 and 64. Then, it stops reading operations of the face reading unit 38-1 and back-side reading unit 38-2.

Figure 4:
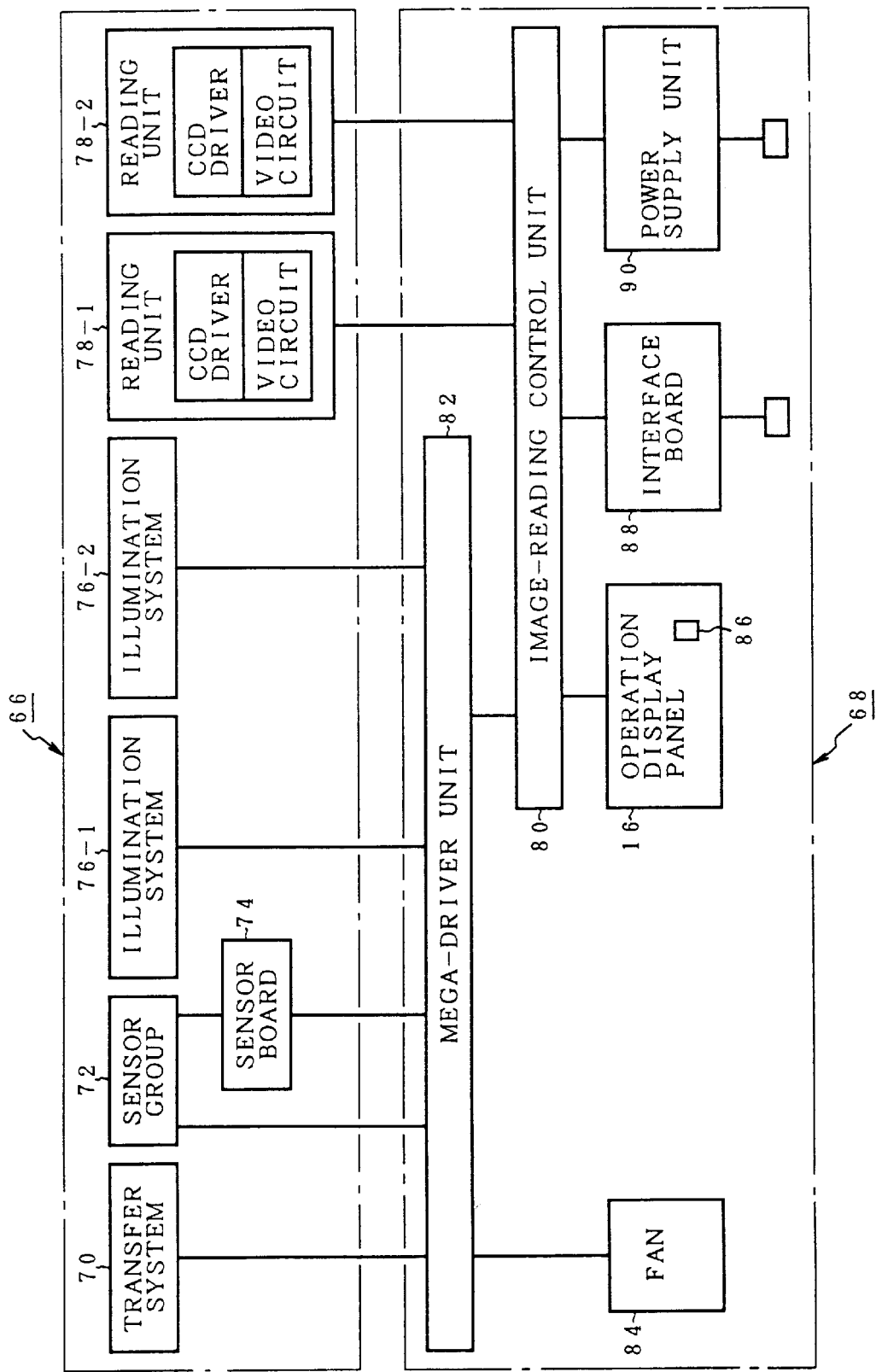
FIG. 4 is a block diagram of the hardware configuration of the apparatus shown in FIG. 1.

FIG. 4 shows hardware configuration of the optical image reading apparatus shown in FIG. 1. The optical image reading apparatus is composed of a control unit 68 and a mechanical unit 66. The mechanical unit 66 comprises: the transfer system 70 having the structure shown in FIGS. 2 and 3; the hopper 12; a group of sensors, 72 provided on the path from the paper transfer path 20 to the stacker 14; a sensor board 74 where circuits necessary for detection processing of the group of sensors, 72 are implemented; and illumination systems 76-1 and 76-2 for illuminating the paper passing through the reading points 62 and 64; and reading units 38-1 and 38-2. An image reading control unit 80 is provided in the control unit 68. The image reading control unit 80 has an MPU and a DSP as control means, and hence, the transfer control according to the present invention is realized in the image reading control unit 80. A mechanism driver unit 82 is provided for the image reading control unit 80, the mechanism driver unit 82 which drives and controls the transfer system 70, group of sensors 72, sensor board 74, and illumination systems 76-1 and 76-2, which are provided in the mechanism unit 66, under the control of the image reading control unit 80. The reading units 38-1 and 38-2 of the mechanism unit 66 are connected to the image reading control unit 80, the reading units 38-1 and 38-2 which each input an image signal read and processed by the CCD driver and video circuit of each reading unit. The image signal is converted into image data through AD conversion, the image data that is saved in memory. Moreover, the mechanism driver unit 82 is provided with a fan 84, which cools the inside of the apparatus. Further, the image reading control unit 80 is provided with an operation display panel 16, an interface board 88, and a power supply unit 90. In the present invention, a sensor mode selection switch 86 is provided in the operation display panel 16, the sensor mode selection switch 86 which is used for selecting one processing between processing by a transmission-type sensor 46 and processing by a reflection-type sensor 48 which are provided before reading points 62 and 64 on the paper transfer path 20 shown in FIGS. 2 and 3. The interface board 88 transmits the image data on the paper, which was read by the image reading control unit 80, to processing apparatus such as an upper host computer and a workstation. The power supply unit 90 receives the input of commercial 100 VAC and generates necessary DC voltages. In addition, as details of the apparatus shown in FIGS. 1–4, for example, what Japanese patent Laid-Open No. 7-283903 was disclosed can be used.

Figure 5:
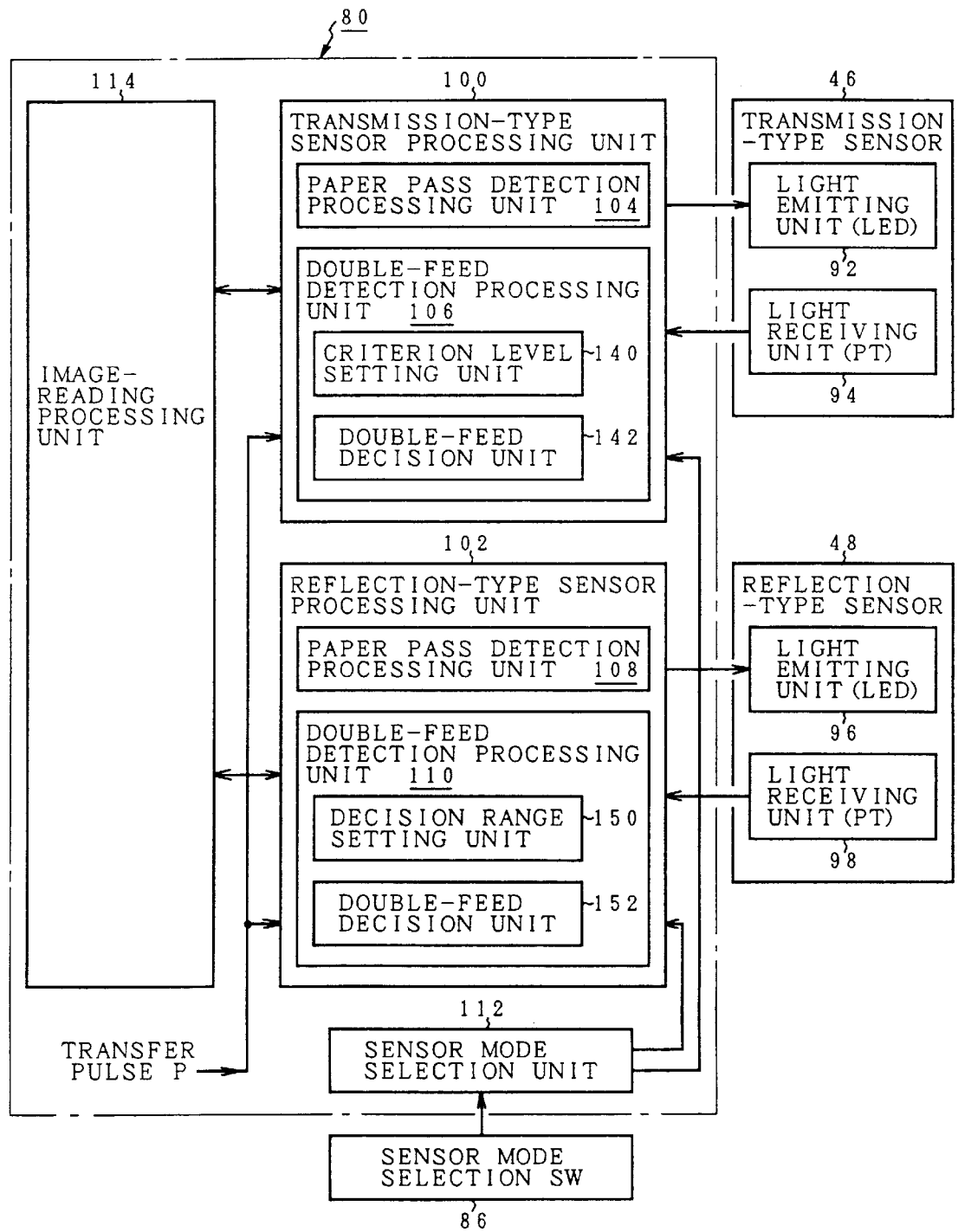
FIG. 5 is a functional block diagram of the present invention.

FIG. 5 is a functional block diagram for realizing the transfer control according to the present invention which is realized by the image reading control unit 80 shown in FIG. 4. The transmission-type sensor 46 and reflection-type sensor 48, which are located before the reading points, are connected to the image reading control unit 80. The transmission-type sensor 46 has a light emitting unit 92 using a light emitting diode (LED), and a light receiving unit 94 providing a photo transistor (PT), the light emitting unit 92 and light receiving unit 94 are located in the opposite side of each other across the paper transfer path. The reflection-type sensor 48 has a light emitting unit 96 using a light emitting diode (LED), and a light receiving unit 98 using a photo transistor (PT). The light emitting unit 96 is located in one side of the paper transfer path with the optical axis of the light emitting unit 96 being oblique to the paper transfer path. And the light receiving unit 98 is located in a light receiving area where the light reflected from an irradiated surface on the paper transfer path enters. The image reading control unit 80 is provided with a transmission-type sensor processing unit 100 corresponding to the transmission-type sensor 46, and with a reflection-type sensor processing unit 102 corresponding to the reflection-type sensor 48. The transmission-type sensor processing unit 100 is composed of a paper pass detection processing unit 104 and a double-feed detection processing unit 106. The paper pass detection processing unit 104 detects the front and back edges of the paper based on the sensor output from the light receiving unit 94 of the transmission-type sensor 46, and instructs the image-reading processing unit 114 to start and stop reading at the arrived area around the reading point after counting until the predetermined number of transfer pulses. A double-feed detection processing unit 106 of the transmission-type sensor processing unit 100 has a criterion-level setting unit 140 and a double-feed decision unit 142. The criterion-level setting unit 140 detects a criterion-level for double-feed decision, at the time when the first sheet of paper was transferred, from a level of received light that follows the quantity of light transmitted from the base color portion of the paper. This criterion-level is set as the criterion-level for double-feed decision when the second or later sheet of paper is transferred. The double-feed decision unit 142 sets the upper limit and lower limit of the decision range based on the criterion-level that was set by the criterion-level setting unit 140 based on the first sheet of paper. Then, the double-feed decision unit 142 decides occurrence of double-feed by comparing the limits with the sensor output of the transmission-type sensor 46 when the paper passes. The paper pass detection processing unit 108 of the reflection-type sensor processing unit 102 detects the front and back edges of the paper based on the sensor output of the reflection-type sensor 48. Then, the paper pass detection processing unit 108 instructs the image-reading processing unit 114 to start and stop reading, when the predetermined number of transfer pulses to the reading point is counted. The paper pass detection processing unit 108 according to the present invention obtains offset due to detection delay when the front-edge of the paper is detected based on the sensor output of the reflection-type sensor 48. Further, the paper pass detection processing unit 108 corrects the sensor detecting position using this offset, and instructs the image-reading processing unit 114 to start reading. Similarly, in regard to the detection of the back-edge of the paper, the unit 108 performs correction using the offset obtained at the time of detecting the front-edge of the paper, and instructs the image-reading processing unit 114 to stop reading. The double-feed detection processing unit 110 of the reflection-type sensor processing unit 102 is provided with a decision range setting unit 150 and a double-feed decision unit 152. The decision range setting unit 150 sets the double-feed decision range by adding and subtracting a predetermined allowance on the basis to/from the number of transfer pulses indicating paper pass time, which was obtained when the first sheet of paper passed. The double-feed decision unit 152 decides occurrence of double-feed by comparing the actual number of the transfer pulses counted during paper passing with the lower and upper limits of the decision range set by the decision range setting unit 150, when the second or later sheet of paper is transferred. The transfer pulse P is given to the transmission-type sensor processing unit 100 and reflection-type sensor processing unit 102. The transfer pulse P is outputted at the rate of one pulse per constant transfer distance when the paper is moved on the transfer path, and hence, the moved distance of paper can be known by counting the number of the transfer pulses P. The transfer pulse P can be generated based on the driving pulse for the stepper motor used for driving the transfer roller, or the pulse generated by the stepper motor provided in the drive roller, where a paper slip rate on the paper transfer path 20 is constant, for example, the drive roller 30 shown in FIGS. 2 and 3 can be used as the transfer pulse P. Further, the image reading control unit 80 is provided with a sensor mode selection unit 112. The sensor mode selection unit 112 enables the processing of the transmission-type sensor processing unit 100 if a transmission-type sensor mode is selected with a sensor mode selection switch 86 provided in an operation display panel. In addition, if reflection-type sensor mode is selected with a sensor mode selection switch 86, the sensor mode selection unit 112 enables the processing of the reflection-type sensor processing unit 102. Selection between the transmission-type sensor mode and reflection-type sensor mode with the sensor mode selection switch 86 can be properly performed according to thickness, size, base color, printed color, a printing method, treatment conditions such as tear-off at a paper edge, a binding hole, and coating of paper. In addition, using user's experience on paper reading, a user can select the sensor mode where jamming and double-feed are fewer. Further, in case jamming and double-feed arise frequently during reading after selecting either of sensor modes, the switch 86 can be also used for performing reading again after switching the sensor modes. Furthermore, it is supposed that read errors arise or jamming arises frequently since double-feed can not be detected, because reading by the transmission-type sensor 46 is continued, the quantity of light becomes low due to attachment of paper powder to the light emitting unit 92 or light receiving unit 94, and hence, a correct sensor output can not be obtained. In this case, it is possible to continuously use the apparatus without inspection, cleaning, and the like of the sensor by switching to the reflection-type sensor 48 whose utilization is low.

Figure 6A:
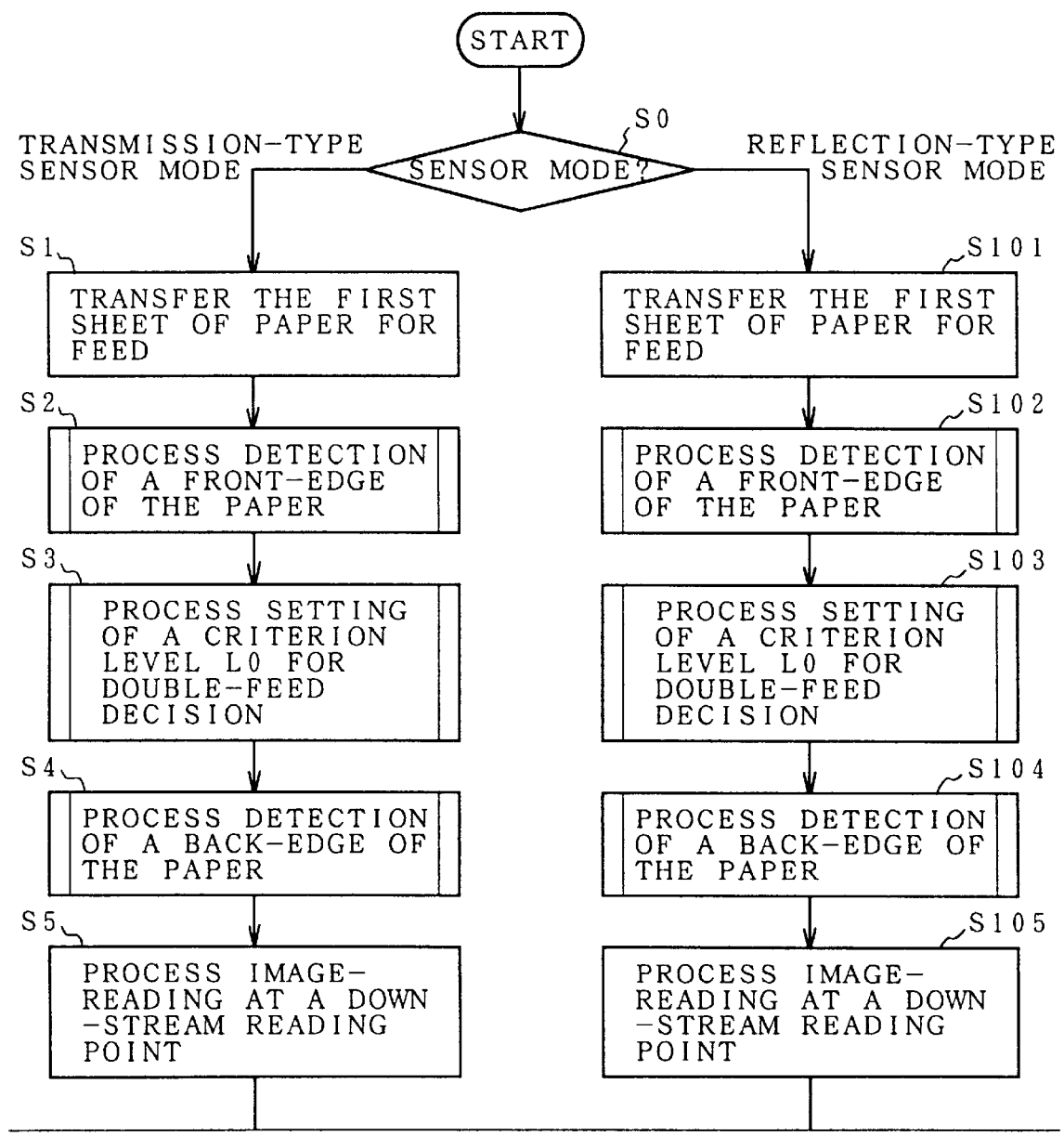
FIGS. 6A–6B is a generic flow chart of paper transfer control according to the present invention.
Figure 6B:
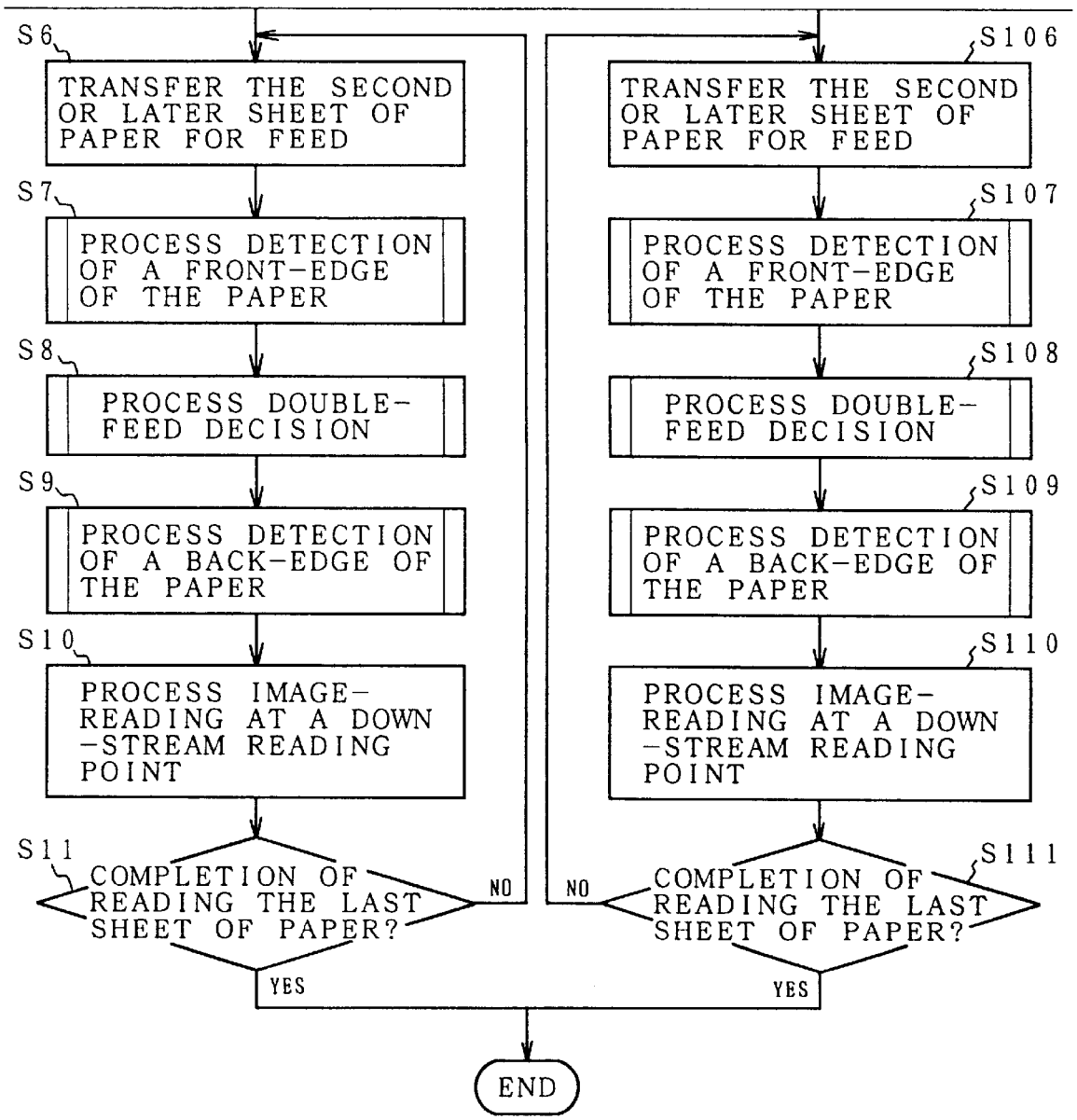

FIG. 6 is a generic flow chart of the paper transfer control used by the image reading control unit 80 shown in FIG. 5. First, at step S0, a sensor mode is decided. If the sensor mode is decided to be the transmission-type sensor mode, the process goes to the processing by the transmission-type sensor processing unit 100 at steps S1–S11. If the sensor mode is decided to be the reflection-type sensor mode, the process goes to the processing by the reflection-type sensor processing unit 102 at steps S101–S111. In the transmission-type sensor mode, first, at step S1, the first sheet of paper is transferred, and next, at step S2, detection processing of a front-edge of the paper is performed by the paper pass detection processing unit 104. Next, at step S3, the criterion-level setting unit 140 of the double-feed detection processing unit 106 performs setting processing of the criterion-level L0 for double-feed decision based on the sensor output regarding the first sheet of paper. Subsequently, at step S4, detection processing of the back-edge is performed in regard to the first sheet of paper. Next, at step S5, read processing such as start and stop of image reading is performed based on the detection processing of the front and back edges of the paper at a downstream reading point. From the next step S6, feed transfer of the second and later sheets of paper is started. Similarly, after performing the detection processing of the front-edge of the paper at step S7, double-feed decision processing is performed at step S8 based on the criterion-level for double-feed decision, L0 obtained by the paper transfer of the first sheet of paper. Next, after the detection processing of the back-edge of the paper is performed at step S9, image processing is performed at the downstream reading point at step S10. The processing at such steps S6–S10 is repeated until reading of the last sheet of paper is completed at step S11. On the other hand, if the sensor mode is decided to be the reflection-type sensor mode, first, at step S101, feed transfer of the first sheet of paper is performed, and next, at step S102, detection processing of the front-edge of the paper is performed. In the reflection-type sensor, the shift from the position right below the sensor at the time when detecting the front-edge of the paper significantly changes according to the conditions of the front-edge of the paper. Therefore, in this detection processing of the front-edge of the paper, the offset indicating the shift from the front-edge is obtained from the changing rate of the sensor output in regard to time. Then, this offset is used for correcting the value used for read processing in the downstream side. Next, at step S103, the criterion-level setting processing is performed. The doublefeed decision in the reflection-type sensor mode is different from that in the transmission-type sensor mode. The number of transfer pulses, P0 necessary for the first sheet of paper passing is obtained, the decision range is set by adding and subtracting a predetermined allowance α to/from the number P0. Subsequently, at step S104, detection processing of the back-edge of the paper is performed. In the detection of the back-edge of the paper, the reflection-type sensor also has the large detection shift depending on back-edge conditions, and hence, correction is performed using the offset value obtained at step S102 at the time of detecting the front-edge of the paper. At step S105, image-reading processing is performed based on the detection processing of the front and back edges of the paper at a downstream reading point. At step S106, feed transfer of the second and later sheets of paper is performed. At step S107, the detection processing of the front-edge of the paper is performed similarly to step S102, and double-feed decision processing is performed at step S108 based on the double-feed decision range obtained on the basis of the first sheet of paper. Next, after the detection processing of the back-edge of the paper is performed at step S109 similarly to step S104, image processing is performed at the downstream reading point at step S110. And, the processing at such steps S106–S110 is repeated until reading of the last sheet of paper is completed at step S111.

Paper Detection of the Transmission-type Sensor

Figure 7:
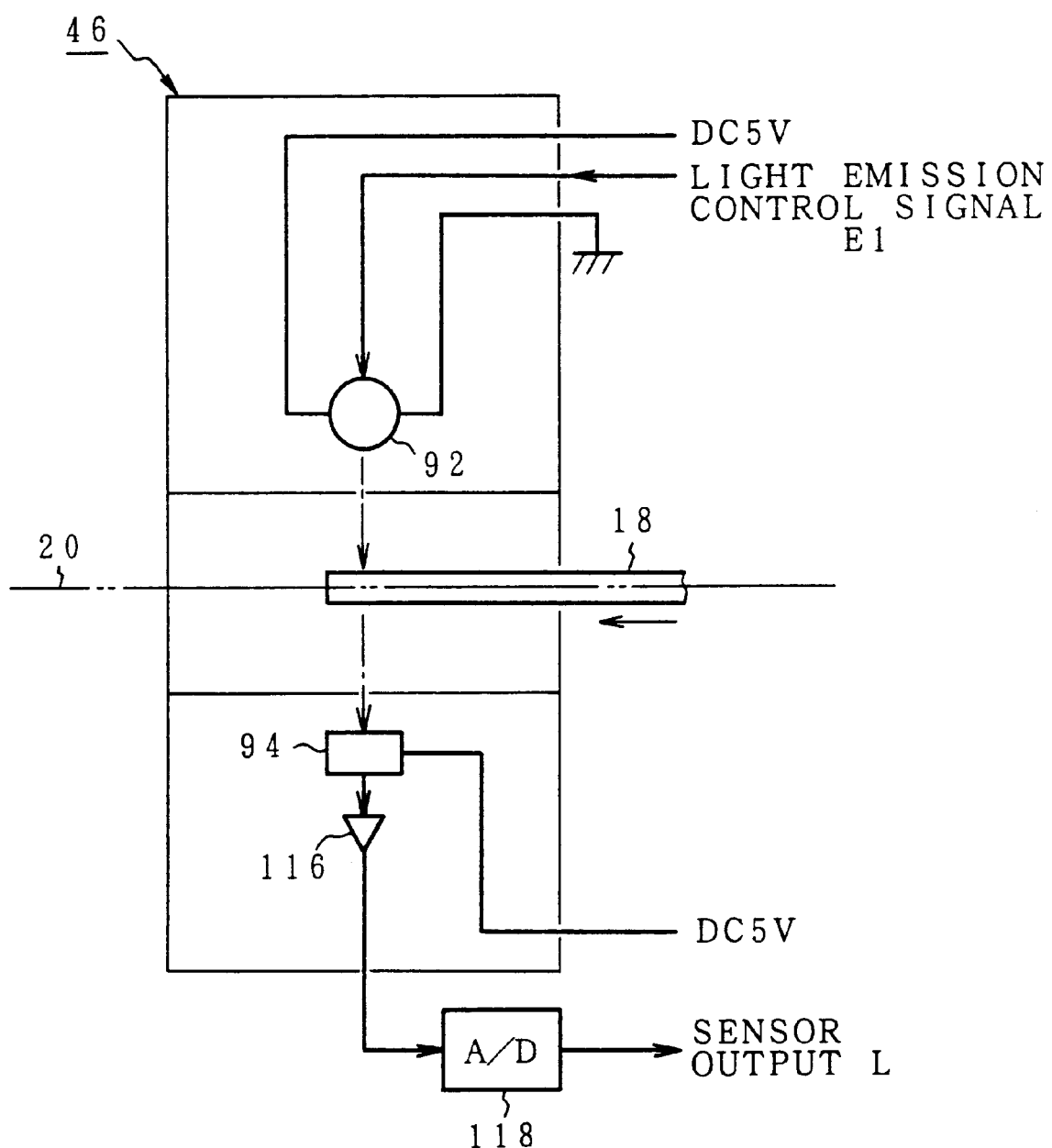
FIG. 7 is an explanatory drawing of a transmission-type sensor shown in FIG. 5.

FIG. 7 shows an implementation form of the transmission-type sensor 46 shown in FIG. 5. The transmission-type sensor 46 is provided with the light emitting unit 92, having the light emitting diode (LED), in one side of the paper transfer path 20, and with the light receiving unit 94, having the phototransistor (PT), in an opposite side. The sensor 46 receives light with a light receiving unit 94, which is emitted by the light emitting unit 92 and transmitted from the paper 18, and converts the light into an electric signal. Further, the transmission-type sensor amplifies the signal with an amplifier 116, converts it into digital data with an AD converter 118, and output the data to the image reading control unit 80 shown in FIG. 5 as the sensor output L. A light emission control signal E1 and 5 VDC voltage are supplied from the transmission-type sensor processing unit 100 to the light emitting unit 92 of the transmission-type sensor 46.

Figure 8:
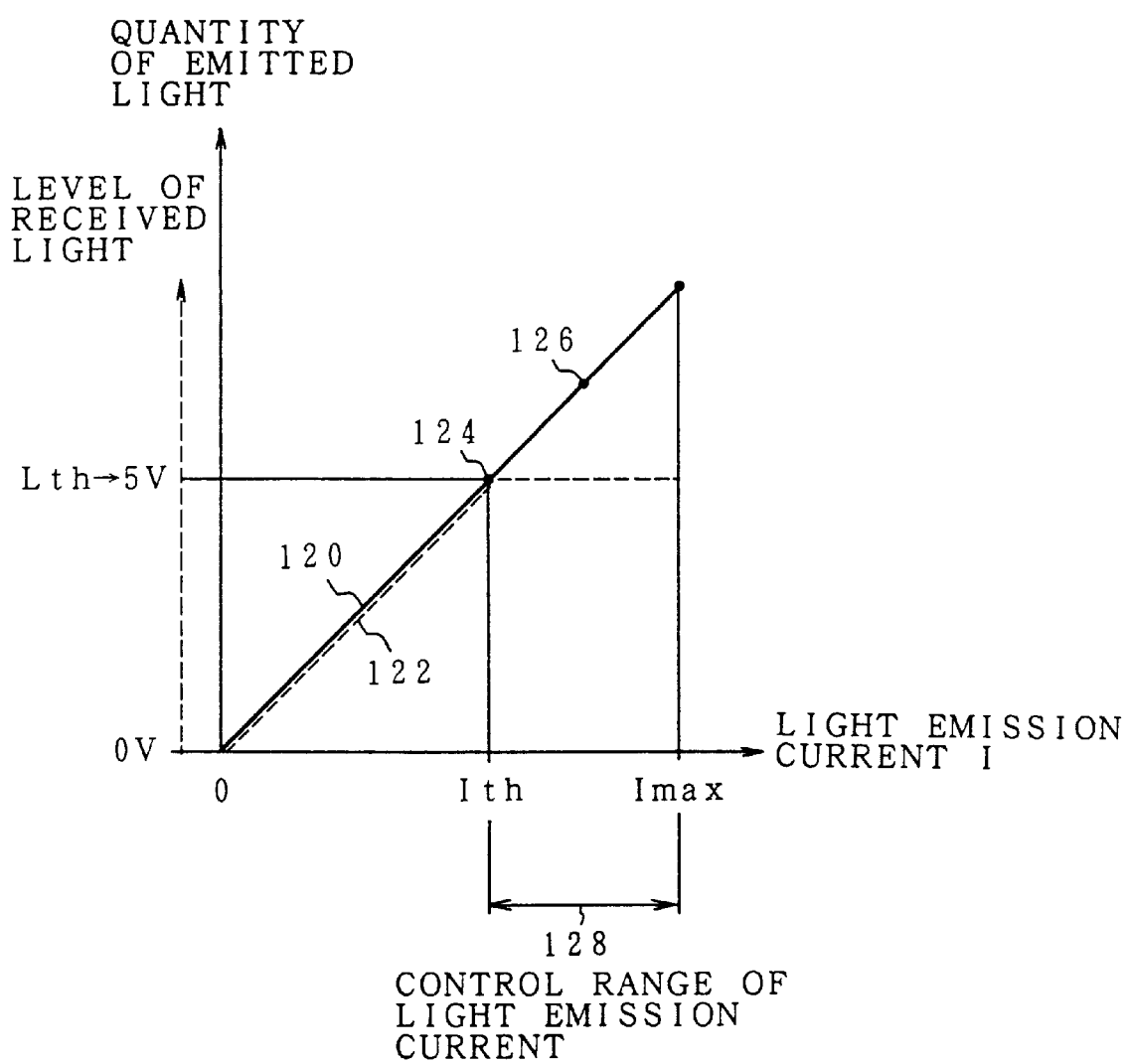
FIG. 8 is an explanatory drawing showing a decision level of paper presence used by a paper pass detection processing unit for the transmission-type sensor shown in FIG. 5.

FIG. 8 shows the characteristics of light emission current I and quantity of emitted light, and the characteristics of the sensor output (level of received light) to the light emission current I. First, for simple description, it is assumed that, as the light emission current I that flows into the light emitting unit 92 increases, the quantity of emitted light increases like a line 120. Against the increase of the quantity of emitted light based on the light emission current like this, the sensor output (level of received light) by the light receiving unit 94 linearly increases like a broken line 122 if the paper 18 does not exist in the sensor 46 and the quantity of emitted light is small. When the light emission current I reaches Ith, the sensor output L is fixed to 5 V of a saturation output Lth, and even if the light emission current I is further increased, the sensor output is kept to be the saturation output Lth. Therefore, a point 124 of the broken line 122 is a saturation point of the sensor output. Against such relation between the sensor output from the light receiving unit 94 and the quantity of light emitted from the light emitting unit 92, the light emission current I is set so that the quantity of light emitted from the light emitting unit 92 may become the operating point 126 exceeding the saturation point 124. And, as for control of the light emission current I in the light emitting unit 92, the control being performed by the light emission control signal E1 shown in FIG. 8, it is defined that the control range of light emission current, 128 is the range from the light emission current Ith at the saturation point of the sensor output, 124 to the maximum current Imax. In this way, by applying to the light emitting unit 92 the light emission current exceeding the saturation point of the sensor output, 124, the sensor output without paper 18 can be always fixed to the saturation level of 5 V, Lth. Also, in these conditions, the quantity of emitted light to the paper 18 can be adjusted within the range of the light emission current from Ith to Imax. Further, the quantity of transmitted light can be adjusted to the light receiving unit 94 when the paper 18 exists in the sensor.

Figure 9:
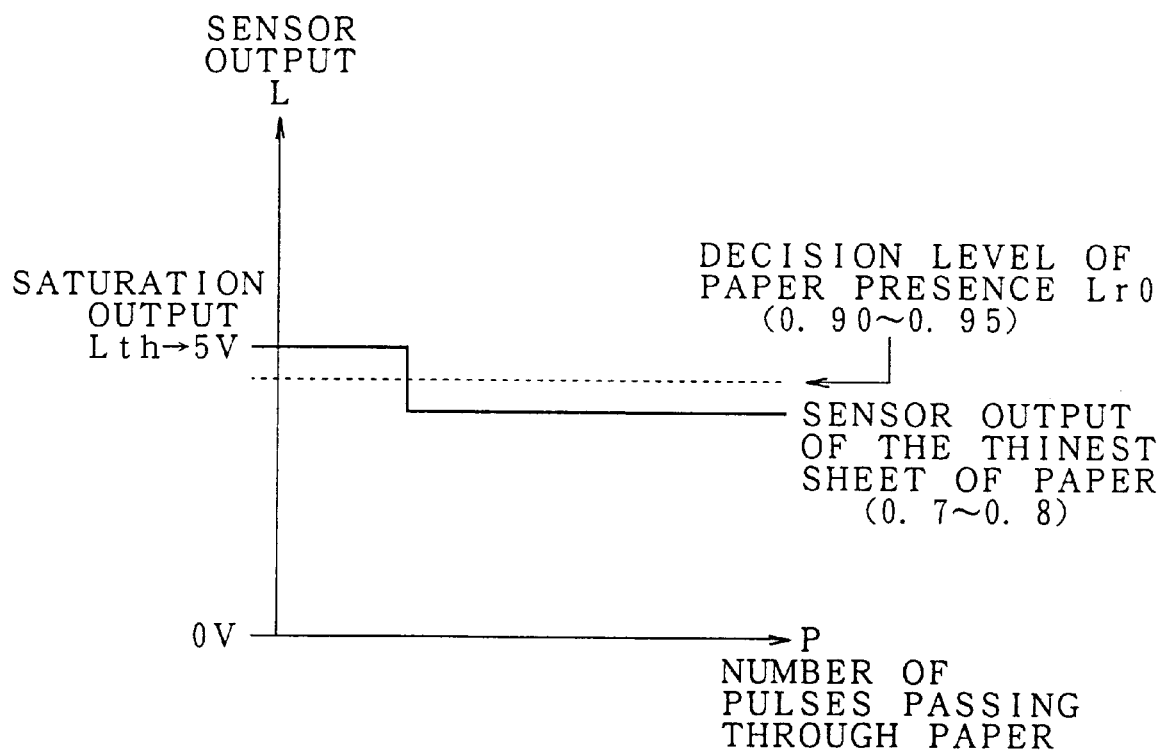
FIG. 9 is a characteristic graph of light emission current vs sensor output of the transmission-type sensor.

FIG. 9 is an explanatory drawing showing setting of the decision level of paper presence for detection of the front and back edges of the paper in the paper pass detection processing unit 104 provided in the transmission-type sensor processing unit 100 shown in FIG. 5. First, the light emission current of the transmission-type sensor is set, for example, at the operational point 126 according to the characteristics shown in FIG. 8. In this time, as the initial conditions shown in FIG. 8, the sensor output L is 5 V of saturation output, Lth. Here, since the transmission-type sensor detects presence of the paper by detecting the decrease of the quantity of transmitted light due to passing the paper, a decision level of paper presence, Lr0 is set so that this sensor can detect the paper having the least quantity of transmitted light, that is, the thinnest sheet of paper usable in this apparatus. Concretely, in the status of positioning the thinnest sheet of paper, which can be read by optical reading apparatus, between the light emitting unit 92 and light receiving unit 94, both of which are shown in FIG. 7, the light emission current I shown in FIG. 8 is adjusted within the control range of light emission current, 128 so that the sensor output L may become 70%–80% of the saturation output Lth. If adjustment of the light emission current using such a thinnest sheet of paper is completed, the decision level of paper presence, Lr0 is set so that the decision level of paper presence, Lr0 may stay within the range of 90%–95% of the saturation output Lth. Owing to this, even if the thinnest sheet of paper, which is readable in this apparatus, passes the transmission-type sensor 46, the sensor output, as shown in FIG. 8, becomes smaller than or equal to the decision level of paper presence, Lr0. Therefore, this sensor can securely detect the front and back edged of the paper.

FIG. 10 is a flow chart showing the setting processing of the decision level of paper presence, Lr0 shown in FIG. 8, and detection processing of the front and back edges of the paper based on this setting processing. In addition, although, as shown at steps S2 and S4 of the generic flow chart in FIG. 6, detection of the front and back edges of the paper is performed separately in respect to time, for easy description, they are shown as a series of processing. First, at step S1, the saturation output without paper, Lth is taken, and at step S2, the decision level of paper presence, Lr0 is set by multiplying the sensor saturation output Lth by a predetermined coefficient δ (=0.90–0.95). Of course, the light emission current in this time, as shown in FIG. 8, has the value to be adjusted so that the quantity of light transmitted from the thinnest sheet of paper may be 70%–80% of the saturation output Lth. Next, at step S3, start of paper transfer is tested, and then, the process goes to step s4 to take the sensor output L in and test whether the sensor output L becomes not larger than the decision level of paper presence, Lr0. When the front-edge of the paper reaches the sensor position, the sensor output L becomes not larger than the decision level of paper presence, Lr0, and hence, the process goes to step S6 to detect the front-edge of the paper. Subsequently, at step S7, the sensor output L is taken so as to detect the back-edge of the paper, and at step S8, the sensor output L is tested whether the sensor output L is larger than the decision level of paper presence, Lr0. If the sensor output L is larger than the decision level of paper presence, Lr0, the process goes to step S9 to recognize the detection of the back-edge of the paper. Reading start at the time when the front-edge of the paper reaches the downstream reading point after detection of the front-edge of the paper performed at step S6 is as follows, because the distance between the sensor detecting point and the reading point is predetermined as the number of the transfer pulses, P0. Namely, the counter is started at the time when the front-edge of the paper was detected at step S6, to start counting of the transfer pulse P, and reading of the paper is started when the value of the counter reaches the number of transfer pulses P0 indicating arrival to the reading point. In addition, similarly to the above, regarding detection of the back-edge of the paper, the back-edge counter starts counting of the transfer pulse at the time of detecting the back-edge of the paper. Then, reading of the paper is stopped when the value of the counter reaches the number of transfer pulses P0 indicating arrival to the reading point.

Double-Feed Detection of the Transmission-type Sensor

In the double-feed detection processing unit 106 provided in the transmission-type sensor processing unit 100 shown in FIG. 5, the control of the criterion-level setting is performed by the criterion-level setting unit 140 when the first sheet of paper is transferred. FIGS. 11A–11D are explanatory drawings showing the control of the criterion-level setting by this criterion-level setting unit 140. FIG. 11A shows detection of paper presence regarding the first sheet of paper. Namely, the front-edge of the paper is detected at time t1, and the back-edge of the paper is detected at time t3 after the period of the number of transfer pulses P0. Corresponding to such detection of the paper presence, the sensor output L changes as shown in FIG. 11B. First, against the saturation output, Lth that is the sensor output L without paper, the criterion-level setting range 130 is set for setting the criterion-level for double-feed decision, L0. The criterion-level setting range 130 is restricted by the upper limit Lup and lower limit Ldown. This criterion-level setting range 130 is the range corresponding to the sensor output according to the quantity of light transmitted from the base color portion of the paper when the paper passes the transmission-type sensor 46, which is 35%–50% of the saturation output Lth. That is, the upper limit Lup is set to be 0.5Lth, and the lower limit Ldown is 0.35Lth. In this case, since the sensor output L is affected if the lower limit Ldown is set to be excessively low, it is desirable to set the lower limit Ldown at least not smaller than 30% of the sensor saturation output Lth. In addition, as for the upper limit Lup, since difference between the upper limit Lup and the decision level of paper presence, Lr0 becomes excessively small if the upper limit Lup is set to be excessively high, it is desirable to set the upper limit Lup at most not larger than 60% of the sensor saturation output Lth. Here, the sensor output L shown in FIG. 11B shows a case that the sensor output level at the time when the first sheet of paper passes is higher than the upper limit Lup of the criterion-level setting range 130. Namely, this is the case that the paper is thin, and decrease of the quantity of transmitted light is small. In this manner, if the sensor output at the time of the paper passing is out of the criterion-level setting range 130, control of the light emission current shown in FIG. 11D is performed, the control pulling the sensor output L in the criterion-level setting range 130. In this case, since the sensor output L at the initial status is excessively large, the sensor output L is pulled in the criterion-level setting range 130 by decreasing the light emission current. Against such control of the light emission current for pulling the sensor output in the criterion-level setting range 130, the control of the light emission current is inhibited, as shown in FIG. 11C, during the period of the number of transfer pulses, Pb for the front-edge of the paper. This reason is that, depending on the kind of paper, the quantity of light transmitted from the base color portion of paper may not be sufficient due to solid printing and seal attaching at the front-edge of the paper. Hence, the control of the light emission current is not performed in regard to fixed width of the front-edge of the paper. After the period of the number of transfer pulses, Pb when the control of the light emission current is inhibited passes, the light emission current is decreases at the predetermined changing rate since time t2. This changing rate at the time of decreasing the light emission current is larger than the changing rate for increasing the light emission current that will be described later. When the sensor output L shown in FIG. 11B is pulled in the criterion-level setting range 130 by decreasing the light emission current, the control of the light emission current is stopped at the point 132 where counting of the counter reaches the predetermined number of transfer pulses Pc from the time when the sensor output is down to the upper limit Lup. Further, the sensor output L at the point 132 is latched in peak hold. Since FIGS. 11A–11D exemplifies the case that the paper has no printing and has base color only, the sensor output L keeps a constant level until the back-edge of the paper is detected at time t3. When the back-edge of the paper is detected at time t3, the value of the sensor output L at the point 132 which was latched in peak hold is set to be the criterion-level for double-feed decision, L0.

Figure 12A:
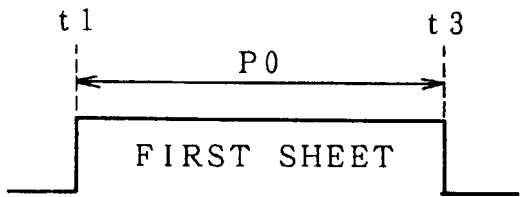
FIGS. 12A–12D are explanatory drawings of criterion-level setting processing used by the criterion-level setting unit for the transmission-type sensor shown in FIG. 5 in case of a high sensor output.
Figure 12B:
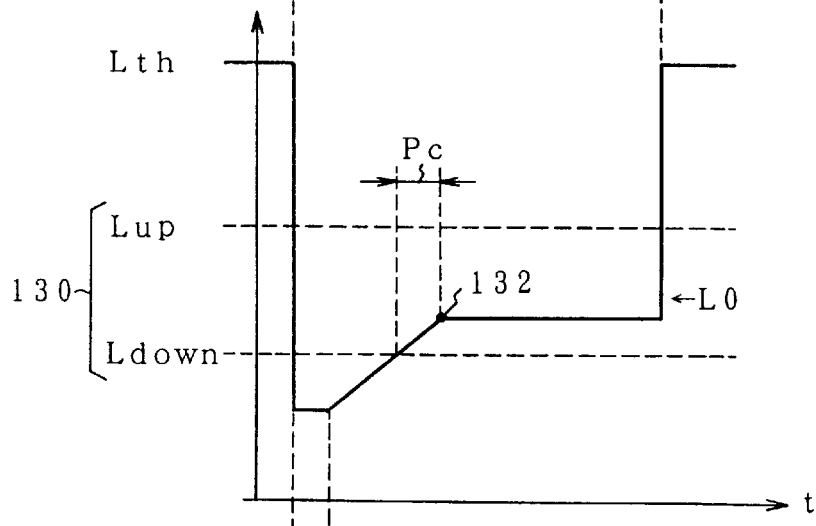
Figure 12C:
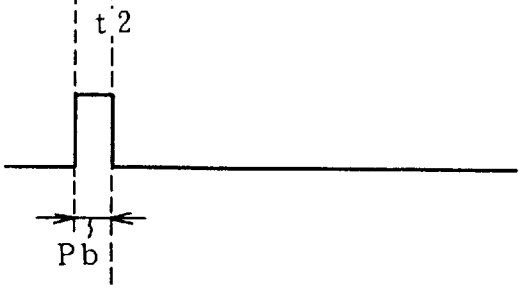
Figure 12D:
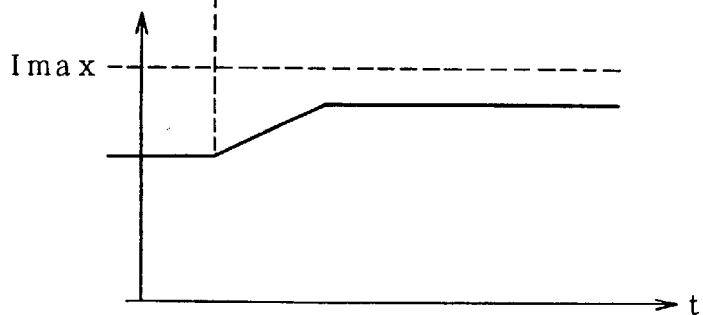

FIGS. 12A–12D show setting control of criterion-level for double-feed decision when the first sheet of paper is thick, and hence, decrease of the quantity of transmitted light at the time of passing the sensor is significant. Corresponding to detection of the first sheet of paper from time t1 to time t3 shown in FIG. 12A, control of the sensor output L is performed as shown in FIG. 12B. In this case, since the first sheet of paper is thick, the sensor output L is not larger than the lower limit Ldown of the criterion-level setting range 130 due to significant decrease of the quantity of transmitted light at the time of detecting the front-edge of the paper. Then, the sensor output L is pulled in the criterion-level setting range 130 by increasing the light emission current I, as shown in FIG. 12D, after inhibiting the control of the light emission current at time t2 until the predetermined number of transfer pulses Pd is counted, as shown in FIG. 12C. In this case, the changing rate at the time of increasing the light emission current I is smaller than the changing rate at the time of decreasing the light emission current I shown in FIGS. 11A–11D. Since the case that the criterion-level setting range 130 is set so that the range 130 may correspond to the quantity of light transmitted from the paper that is the object to be read, the sensor output at the time of paper passing which exceeds the upper limit Lup as shown in FIG. 11B arises in the case that openings like a binding hole, tear-off, and the like exist at the front-edge of the paper. Because, in either case, the quantity of transmitted light does not correspond to the base color portion of the paper, the sensor output L is rapidly pulled in the criterion-level setting range 130 by increasing the changing rate at the time of decreasing the light emission current. On the other hand, in case the sensor output is smaller than the lower limit Ldown of the criterion-level setting range 130 as shown in FIG. 12B, it is the case that solid printing, seal attaching, and the like are performed at the front-edge of the paper. If, in this status, the sensor output is pulled in the criterion-level setting range 130 by increasing the changing rate at the time of increasing the light emission current, the sensor output will suddenly exceed the upper limit Lup when the next base color portion of the paper comes. Therefore, on the contrary, the light emission current should be reduced. In order to prevent such fluctuation of the sensor output L caused by the control of the light emission current, the changing rate at the time of increasing the light emission current is made to be smaller than the changing rate at the time of decreasing the light emission current. When the sensor output L reaches the lower limit Ldown by the control for increasing the light emission current I as shown in FIG. 12D, the control of the light emission current I is stopped at the point 132 where the predetermined number of transfer pulses Pc is counted. Further, sample holding of the sensor output L is performed at that time, the sensor output finally latched in peak hold at the time of detecting the back-edge of the paper at time t3 is set as the criterion-level L0.

Figure 13A:
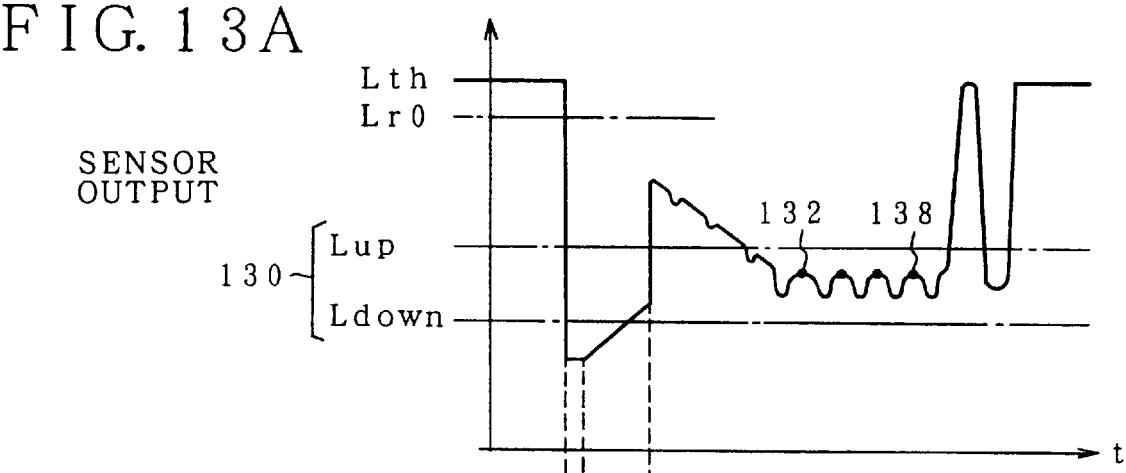
FIGS. 13A–13C are explanatory drawings of criterion-level setting processing used by the criterion-level setting unit for the transmission-type sensor shown in FIG. 5, by exemplifying paper having solid printing and a binding hole.
Figure 13B:
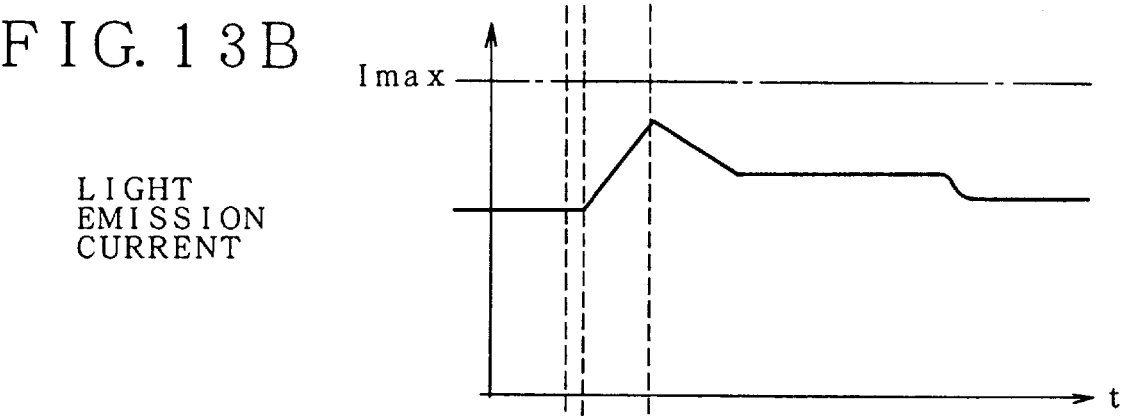
Figure 13C:
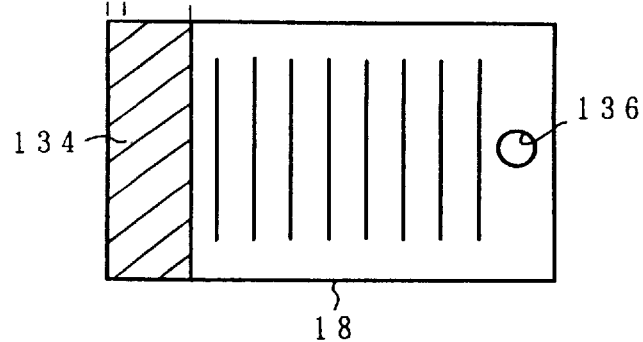

FIGS. 13A–13C show the actual control of criterion-level setting whose object is the paper with solid printing at its front-edge and a binding hole at its back-edge. As shown in FIG. 13C, the paper 18 has solid printing 134 at its front-edge, and has a binding hole 136 at its back-edge. Between them, characters are printed as shown in heavy lines. The sensor output for this paper 18, as shown in FIG. 13A, becomes not larger than the lower limit Ldown of the criterion-level setting range 130 due to the solid printing 134 at the front-edge of the paper 18. After the fixed inhibited period of light emission control, the control for increasing the light emission current I is performed as shown in FIG. 13B. However, when the base color portion of the paper 18 comes after the solid printing 134 of the paper 18, the sensor output L step-wise rises over the upper limit Lup due to increase of the quantity of transmitted light. Owing to this, on the contrary, the light emission current I is reduces by the control. If the sensor output has been continuously within the criterion-level setting range 130 during the fixed time from the time when the sensor output becomes smaller than the upper limit Lup, the light emission control is stopped at that time. And peak hold of the sensor output L at that time is performed. After that the sensor output L decreases corresponding to decrease of the quantity of transmitted light at the screw portion, and then, the sensor output recovers to the level corresponding to the quantity of light transmitted from the base color portion of the paper. Against the change of the sensor output L decreasing at the character portions like this, peak hold of the sensor output corresponding to the quantity of light transmitted from the white base color is performed. Further, after performing the peak hold at the point 138, the sensor output L step-wise rises by the binding hole 136 of the paper 18 passing. If the sensor output L exceeds the upper limit Lup of the criterion-level setting range 130 like this, the control of the light emission current I, that is, the control for decreasing the light emission current I is performed so as to pull the sensor output in the criterion-level setting range 130. However, when the biding hole 136 goes beyond, the sensor output L returns to the criterion-level setting range 130 again. But, since the sensor output L is lower than the peak hold value 138 just before the binding hole 136, the peak hold value is not updated, and the value at the point 138 which is the peak hold value at the time of detecting the back-edge of the paper thereafter is set to be the criterion-level L0.

FIGS. 14A–14B are flow charts of criterion-level setting processing by the criterion-level setting unit 140 provided in the transmission-type sensor processing unit 100 shown in FIG. 5. First, at step S1, counting of the transfer pulse by the counter P is started based on the detection of the front-edge of the paper. Next, at step S2, the upper limit Lup and lower limit Ldown of the criterion-level setting range 130 are calculated using the sensor the saturation output without paper, Lth, a lower limit setting coefficient β1, and a upper limit setting coefficient β2. In this case, it is set that β1=0.35 and β2=0.50. Subsequently, at step S3, whether the counted value of the counter P which started to count pulses at step S1 reaches the predetermined number of transfer pulses Pb for the prohibition control of the light emission current is tested. If the value reaches the predetermined number of transfer pulses Pb, the prohibition control of the light emission current is released, and the control of the light emission current is started from step S4. At step S4, the sensor output L is taken, which is compared with the lower limit Ldown of the criterion-level setting range at step S5. If the sensor output L is smaller than the lower limit Ldown, the process goes to step S6 to perform the control for increasing the light emission current. Actually, a predetermined current increment ΔI1 is added to the present light emission current I every control period of the light emission current, and at step S4, processing for taking the sensor output L after increasing of the light emission current is repeated. If, at step S5, the sensor output L is not smaller than the lower limit Ldown, the process goes to step S7 to test whether the sensor output is not larger than the upper limit Lup. If the sensor output L is larger than the upper limit Lup, the process goes to step S8 to perform the control for increasing the light emission current. That is, after the light emission current is decreased by subtracting the predetermined current decrement ΔI2 from the present light emission current I every control period of the light emission current, the sensor output L is taken at step S4. Until the sensor output L becomes not larger than the upper limit Lup, the control for decreasing the light emission current is repeated at step S8. When the sensor output L is within the light emission current setting range where the sensor output L is not smaller than the lower limit Ldown and not larger than the upper limit Lup, the process goes to step S9. Then, whether the sensor output L is continuously within the range over the predetermined number of transfer pulses Pc is tested. If the sensor output L is within the setting range over the predetermined number of transfer pulses Pc, the process goes to step S10 to take the sensor output L. On the premise that the sensor output L is within the setting range at step S11, peak hold of the sensor output is performed at step S12. And, until the back-edge of the paper is detected at step S14, processing at steps S10–S12 is repeated. As for the peak hold while the sensor output is within the criterion-level setting range, if the sensor output goes out of the criterion-level setting range on the way, the process goes to step S13 to restart the control of the light emission current and inhibit the peak hold. After detecting the back-edge of the paper at step S14, the process goes to step S15 finally to set the peak hold value as the criterion-level for double-feed decision, L0 and go to detection processing of the second and later sheets of paper.

FIGS. 15A–15E shows decision processing by the double-feed decision unit 142 provided in the double-feed detection processing unit 106 of the transmission-type sensor processing unit 100. If the criterion-level for double-feed decision, L0 is set by the light emission current control for the sensor output shown in FIG. 15B based on the paper detection over time t1–t3 shown in FIG. 15A, the double-feed decision processing is performed for the sensor output L at the time of the second sheet of paper passing from time t4. First, before the detection of the second sheet of paper, the lower limit Lr1 and upper limit Lr2 of the double-feed decision range is set based on the criterion-level L0 set at the time of the first sheet of paper passing. This lower limit Lr1 is set to be 60%–70% of the criterion-level L0. Let this lower limit setting coefficient to be δ1, and let δ1 be 0.6–0.7. Then, the lower limit Lr1 is set to be Lr1=δ1×L0. In addition, the upper limit Lr2 is set to be 125%–150% of the criterion-level L0. Let this upper limit setting coefficient be δ2, and let δ2 be 1.25–1.50. Then the upper limit Lr2 is set to be Lr2=δ2×L0. Here, the lower limit Lr1, as shown in later description, decides double-feed of the presently transferred second or later sheet of paper. Against this, the upper limit Lr2 decides the double-feed of the first sheet of paper. FIG. 15C shows a decision inhibiting signal, which inhibits decision processing of double-feed during the period of the predetermined number of transfer pulses Pd regarding the front-edge of the second sheet of paper. This is to prevent erroneous double-feed decision in case the sensor output goes out of the double-feed decision range due to the solid printing and a binding hole at the front-edge of the paper. FIG. 15D shows a signal indicating the period of the pulses passing through the paper, P0 obtained at the time of detecting the first sheet of paper. Therefore, in the case of the double-feed decision for the second and later sheets of paper, the double-feed decision is enabled over the period of the pulses passing through the paper, P0. Consequently, the period of substantial double-feed decision, as the decision gate signal shown in FIG. 16E, is the period, P0–Pt, obtained by subtracting the predetermined number of pulses, Pt of the decision gate signal shown in FIG. 15C from the number of pulses passing through the first sheet of paper, P0 shown in FIG. 15D.

FIGS. 16A–16G shows decision processing in the case that double-feed arises at the time of transferring the second sheet of paper. It is assumed that, for example, double-feed of the paper 18-2 and 18-3, as shown in FIG. 16F, arises. Corresponding to such double-feed of the paper 18-2 and 18-3, the sensor output L shown in FIG. 16B becomes lower than the lower limit Lr1 of the double-feed decision range at a portion where two sheets of paper 18-2 and 18-3 overlap. Owing to this, the double-feed decision of the sensor output L is performed during the period of the decision gate signal shown in FIG. 16E, the signal which is defined by the decision inhibiting gate signal shown in FIG. 16C and the pulse signal passing through the first sheet of paper shown in FIG. 16A. When the sensor output L becomes lower than the lower limit Lr0 of the decision range, the double-feed decision signal shown in FIG. 16E rises from the level L to the level H. Then, error handling of the apparatus is performed after receiving this double-feed decision signal.

FIGS. 17A–17G shows double-feed decision processing in the case that double-feed arises at the time of transferring the first sheet of paper. It is assumed that, for example, double-feed of the paper 18-1 and 18-2, as shown in FIG. 17F, arises. Corresponding to such double-feed of the paper 18-1 and 18-2, the sensor output L shown in FIG. 17B decreases initially. However, without considering the double-feed decision, the sensor output L is pulled in the criterion-level setting range 130 by the control for increasing the light emission current. Further, the criterion-level L0 is set based on the last peak hold value at the time of detecting the back-edge of the paper. As for detection of the second sheet of paper from time t4, as shown in FIG. 17F, the paper 18-3 only is correctly transferred, and the sensor output shown in FIG. 17B becomes larger than the upper limit Lr2 obtained from the criterion-level L0 that was set based on the double-feed of the first sheet of paper. Owing to this, when the decision inhibiting gate signal shown in FIG. 17C turns off at time t5, the double-feed decision signal shown in FIG. 17E rises from the level L to the level H. Then, the decision result is outputted on a display, and corresponding processing can be performed.

FIGS. 18A–18E are explanatory drawings of decision processing additionally provided so as to prevent malfunction in the case that double-feed can not be decide using the double-feed decision range obtained from the criterion-level for double-feed decision, L0 that was set at the time when the first sheet of paper was transferred. In the double-feed decision in FIGS. 18A–18E, the value (P0+α) that is obtained from adding the predetermined allowance α to the number of pulses passing through the paper, P0 obtained at the time of the first sheet of paper is set as the criterion pulse count signal as shown in FIG. 18D. Then, counting operation by the transfer pulse counter is started at the time when the front-edge of the second sheet of paper is detected at time t. In this time, the sensor output L at the time when double-feed of the paper 18-2 and 18-3 arises is casually within the range which is not smaller than the lower limit Lr1 of the double-feed decision range and not larger than the upper limit Lr2. Therefore, double-feed decision can not be performed. Then, when the front-edge of the second sheet of paper is detected at time t4, counting by the transfer pulse counter is started. And, when the counted value of the counter reaches the criterion pulse count (P0+α), shown in FIG. 18D before detecting the back-edge of the paper, the feed is decided as double-feed, and the doublefeed decision signal shown in FIG. 18E rises from the level L to the level H. Owing to this setting of the criterion pulse count, shown in FIGS. 18A–18E, based on the number of pulses passing through the first sheet of paper, P0, following advantages are provided. Namely, it becomes possible to perform the decision processing as a recovery in the case that double-feed can not be detected by setting the decision range based on the criterion-level L0 obtained by the control of the light emission current at the timing of the first sheet of paper. Therefore, it becomes possible to increase the reliability of the double-feed decision.

FIG. 19 is a flow chart of decision processing by the double-feed decision unit 142 provided in the double-feed detection processing unit 106 of the transmission-type sensor processing unit 100 shown in FIG. 5. First, at step S1, the counter P is started, the counter P which counts pulses passing through the paper at the time of detecting the front-edge of the second and later sheets of paper. Next, at step S2, based on the criterion-level L0 detected at the time of the first sheet of paper, the lower limit Lr1 and upper limit Lr2 of the decision range are calculated by multiplying the lower limit setting coefficient γ1 and the upper limit setting coefficient γ2, which were predetermined, by the criterion-level L0. Subsequently, at step S3, the process waits arrival to the predetermined number of transfer pulses Pd from detection of the front-edge of the paper, and starts double-feed decision processing since step S4. First, the sensor output L is taken at step S4, and whether the sensor output L is smaller than the lower limit Lr1 is tested. If the sensor output L is smaller than the lower limit Lr1, this means the double-feed status of the second sheet of paper shown in FIGS. 16A–16G. Then, the process goes to step S8 to decide double-feed of the paper presently passing. Next, the process goes to step S9 to perform error handling of the transfer control and display double-feed of the paper presently passing. This error handling includes stopping feed of the next and later sheet of paper from the hopper 12 at the time of detecting the double-feed, and stopping the transfer operation after all of the paper presently existing on the paper transfer path 20 are sent to the stacker 14 and discharged. In addition, since the double-feed of the paper presently passing is displayed, it is possible to pick the paper following the paper caused the double-feed among the paper discharged in the stacker 14, return the paper to the hopper 12, and restart reading of the paper. Of course, since restart of reading on the way requires complicated processing, it can be performed to clear all of the read processing until that time, return all of the paper in the stacker 14 to the hopper 12, and read the paper from the beginning. In addition, if the sensor output L is not smaller than the lower limit Lr1 at step S5, the process goes to step S8 to test whether the sensor output L exceeds the upper limit Lr2. If the sensor output L exceeds the upper limit Lr2, this means the double-feed of the first sheet of paper as shown in FIGS. 17A–17G, and hence, the process goes to step S9 to decide the double-feed of the first sheet of paper. Further, error handling and display of double-feed of the first sheet of paper are performed at step S10. Furthermore, if the sensor output L is within the double-feed decision range at steps S5 and S8 since the sensor output L is not smaller than the lower limit Lr1 and not larger than the upper limit Lr2, and hence, paper is normally transferred, the process goes to step S11 to test whether the counted value of the transfer pulse counter P reaches the number of pulses passing through the first sheet of paper, P0. If the value reaches P0, the process goes to step S12 to test the detection of back-edge of the paper. Until the back-edge of the paper is detected, whether the counted value of the counter P reaches the value (P0+α), which is obtained by adding the predetermined allowance α to the number of pulses passing through the first sheet of paper, P0, is tested at step S13. If the value of the counter P reaches the decision value (P0+α) at step S13 before detecting the back-edge of the paper, this means the double-feed shown in FIG. 19, and hence, the process goes to step S6 to decide the double-feed of the paper presently passing. Further, at step S7, error handling and double-feed display of the paper presently passing are performed.

Paper Detection of the Reflection-type Sensor

FIG. 20 shows an implementation form of the reflection-type sensor 48 shown in FIG. 5. The reflection-type sensor 48 is provided with the light receiving unit 98 for the light emitting unit 96 in one side of the paper transfer path 20, and with the light emitting unit 98 whose optical axis is oblique to the paper transfer path 20, and the light receiving unit 98 is located in its reflection direction. The light emitting unit 96 is provided with the light emitting diode (LED), and receives 5 VDC from the power supply, and further, its light emission current can be controlled with the light emission control signal E2. The light receiving unit 98 has the phototransistor (PT), receives the light that is emitted by the light emitting unit 96 and reflected from the passing paper 18, and after amplifying it by an amplifier 160, the unit 98 converts it into a digital signal with an AD converter. The unit 98 outputs the signal to the image reading control unit 80 shown in FIG. 6 as the sensor output L.

Figures 21, 22:
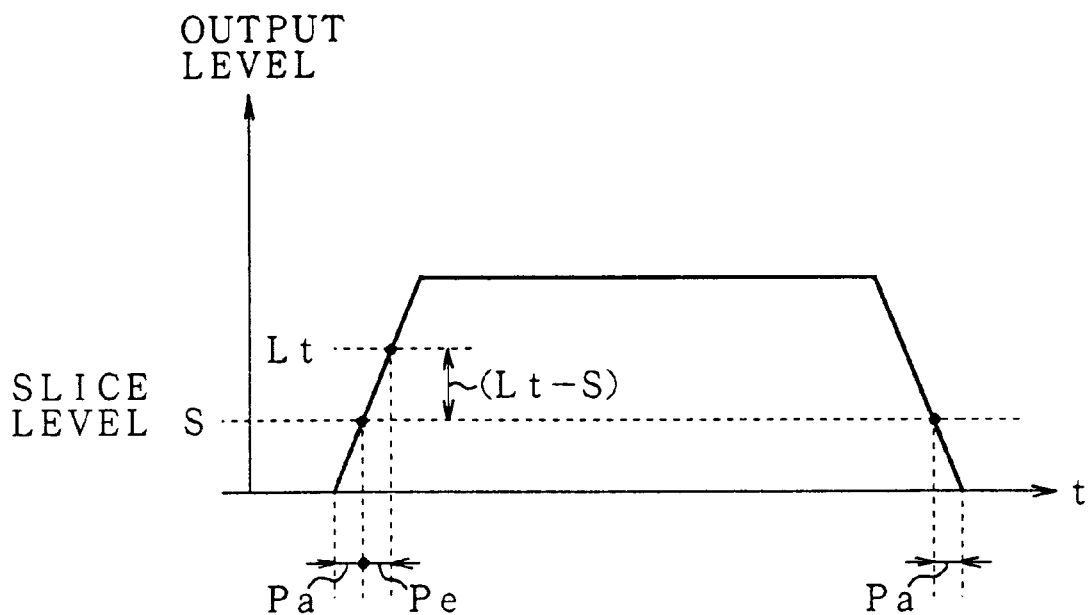
FIG. 21 is an explanatory drawing of paper detection and offset due to detection delay by a paper pass detection processing unit for the reflection-type sensor shown in FIG. 5.
FIG. 22 is an explanatory drawing of table information for obtaining offset based on a differential value shown in FIG. 21.

FIG. 21 shows the change of the sensor output L at the time when the paper 18 passes the reflection-type sensor 48 shown in FIG. 20. In the case of the reflection-type sensor 48, differing from the transmission-type sensor 46 shown in FIG. 7, the output of received light at the time when the front-edge of the paper 18 passes just below the sensor almost linearly increases with some slope. And, the output at the time of the back-edge of the paper also decreases with some slope from the fixed level. For such change of the sensor output L, the slice level S is predetermined for detection of paper presence. However, in the detection of the front-edge of the paper using the slice level S, a shifted position different from the actual front-edge of the paper is detected as the front-edge of the paper. Then, in the detection of the front-edge of the paper using the reflection-type sensor according to the present invention, the shifted quantity from the front-edge of the paper to the position where the output of received light reaches the slice level S is obtained as the offset value Pa from the changing rate of the sensor output L at the time when the front-edge of the paper passes. By correcting the data for position discrimination of the downstream reading point using this offset value Pa, setting of correct read timing becomes possible. Regarding the calculation of the changing rate of the sensor output L at the time when the front-edge of the paper passes in FIG. 21, the output of received light at the time when the predetermined number of pulses Pe is counted after the sensor output L reached to the slice level S is obtained as Lt. Further, the offset value Pa is obtained from the differential value (Lt−S) between this output of received light, Lt and the slice level S. Here, assuming that the leading edge at the edge portion of the output of received light is linear, using the pulse number Pe and the differential value (Lt−S), the formula of the slope T becomes T=(Lt−S)/Pe. Therefore, the offset value pa can be obtained from the linear equation. Since it is complicated to calculate this offset value Pa every time, in this implementation form, as shown in FIG. 22, table information is generated in which offset values Pa1–Pan which were beforehand calculated by setting the differential value (Lt−S), as differential values ΔL1–ΔLn are registered. And, referring to the table shown in FIG. 23 using the differential value (Lt−S), obtained from the actual output of received light, L, the corresponding offset value Pa can be obtained.

Figure 23:
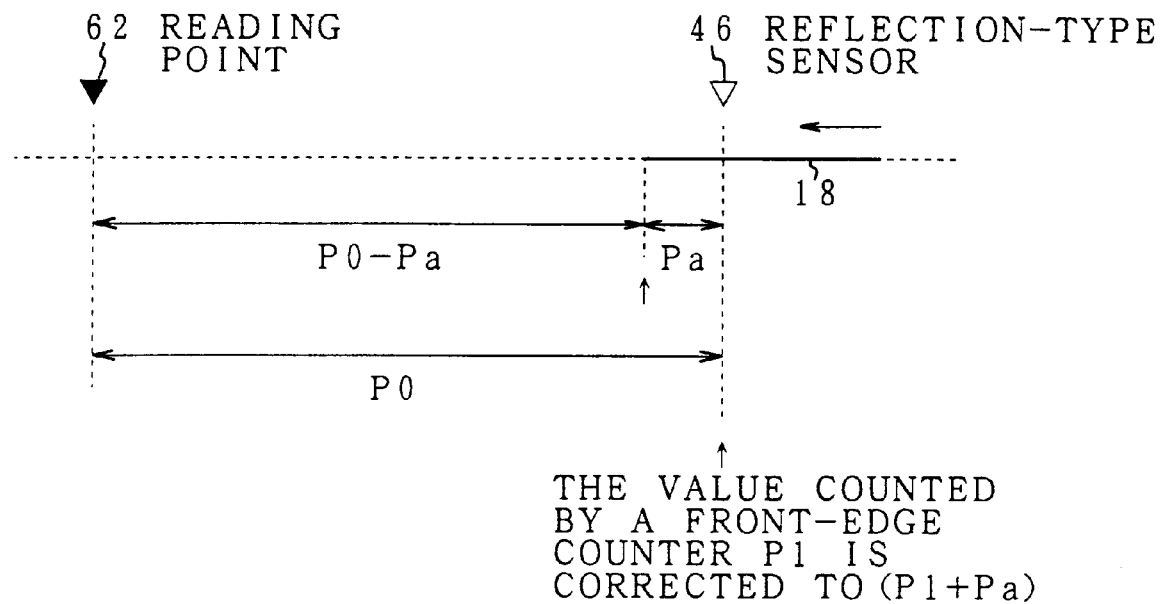
FIG. 23 is an explanatory drawing showing correction processing of the front-edge of paper using the offset value obtained in FIG. 22.

FIG. 23 shows correction processing for deciding arrival of the front-edge of the paper to the downstream reading point 62 when the offset value Pa is obtained by detecting the front-edge of the paper using the reflection-type sensor. The shift from the front-edge of the paper at the time when the sensor output L of the reflection-type sensor 48 reaches the slice level S to the sensor position can be obtained as the offset value Pa. Therefore, regarding the time when this sensor output L reaches the slice level S as the point where the front-edge of the paper is detected before correction, the counting operation of the front-edge counter P1 is started, the counter P1 which counts the transfer pulses to the reading point 62. In the same time, the counted value is corrected to the value (P1+Pa) which is obtained by adding the offset value Pa to the counted value of the front-edge counter P1. Consequently, the initial value of the front-edge counter P1 which started at the time of the reflection-type sensor 48 detecting the front-edge of the paper is corrected to the offset value Pa. Counting of the front-edge counter P1 is started under the condition that the offset value Pa is preset. Owing to this, at the time when the counted value of the front-edge counter P1 which coincides with the residual pulse count (P0−Pa) indicating the actual section between the front-edge of the paper and the reading point 62 is obtained, the reading operation can be started by deciding arrival of the paper to the reading point 62. Referring to FIG.

21 again, the sensor output linearly decreases at the back-edge of the paper, and the back-edge of the paper is detected when the sensor output returns to the slice level S. However, since there is a shift between it and the actual back-edge of the paper, this shift is corrected as a quantity similar to the offset value Pa obtained at the front-edge of the paper.

Figure 24:
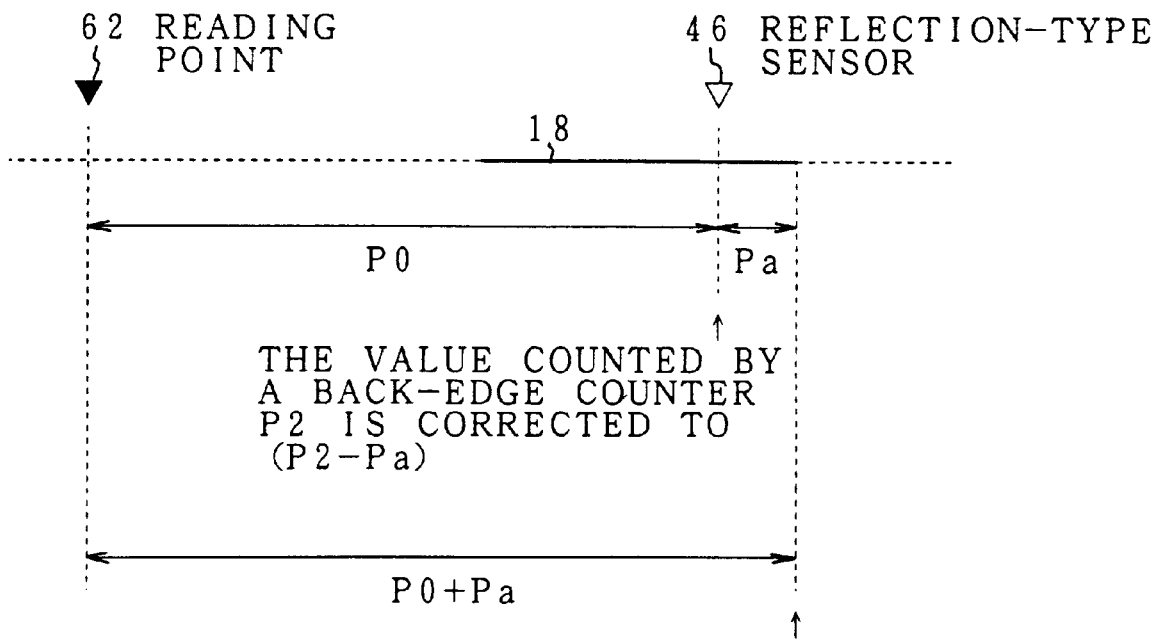
FIG. 24 is an explanatory drawing showing correction processing of the back-edge of paper using the offset value obtained in FIG. 22.

FIG. 24 shows correction processing at the time when the back-edge of the paper is detected with the reflection-type sensor 48, that is, the time when the sensor output L returns to the slice level S. In this time, counting of the transfer pulses by the back-edge counter P2 is started, the counter P2 which is used for discriminating arrival of the back-edge of the paper to the reading point 62. In the same time, the offset value Pa is subtracted from the counted value of the back-edge counter P2. Namely, the back-edge counter P2 which started at the time of the reflection-type sensor detecting the back-edge of the paper starts counting of the transfer pulses under the condition that -Pa is preset. Owing to this, the pulse count of the back-edge counter P2 for deciding the arrival to the reading point 62 becomes (P0+Pa), and hence, when the value counted by the back-edge counter P2 reaches the pulse count (P0+Pa), the actual arrival of the back-edge of the paper to the reading point 62 can be decided.

Figure 25B:
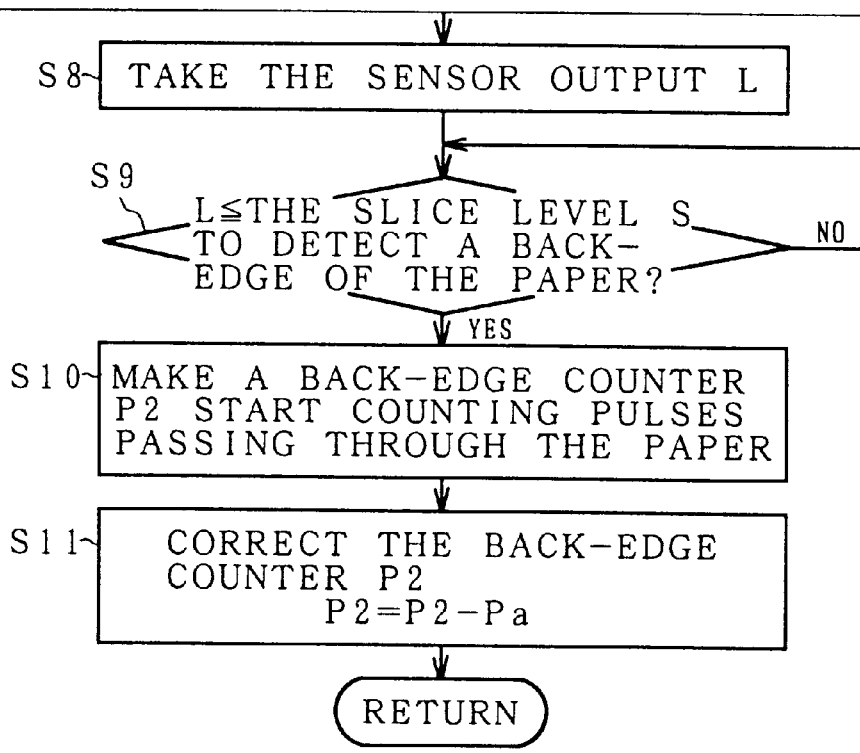

FIG. 25 is a flow chart showing the processing of detecting the front and back edges of the paper by the paper pass detection processing unit 108 provided in the reflection-type sensor processing unit 102 shown in FIG. 5. First, at step S1, the sensor output L of the reflection-type sensor 48 is taken, and whether the front-edge of the paper is detected, that is, whether the sensor output is not smaller than the slice level S is tested at step S2. If the sensor output is not smaller than the slice level S, the process goes to step S3 as the detection of the front-edge of the paper to start counting of the pulses passing through the paper by the front-edge counter P1. Subsequently, the process goes to step S4 to test whether the value counted by the front-edge counter P1 reaches the predetermined pulse count Pe. If the value reaches Pe, the process goes to step S5 to latch the sensor output L at that time as Lt and calculate the differential value (Lt–S). Next, at step S6, the table information shown in FIG. 23 is referred using the differential value (Lt–S), and consequently, the offset value Pa is resolved. Subsequently, at step S7, the front-edge counter P1 that has already started counting is corrected to P1=P1+Pa using the offset value Pa. Next, at step S8, the sensor output L is taken, and, at step S9, whether the back-edge of the paper is detected, that is, whether the sensor output L is not larger than the slice level S is tested. If the sensor output L is not larger than the slice level S, the process goes to step S10 to start the counting of pulses passing through the paper by the back-edge counter P2. At step S11, the back-edge counter P2 is corrected to P2=P2–Pa using the offset value Pa resolved at the time of detecting the back-edge of the paper.

Figure 26:
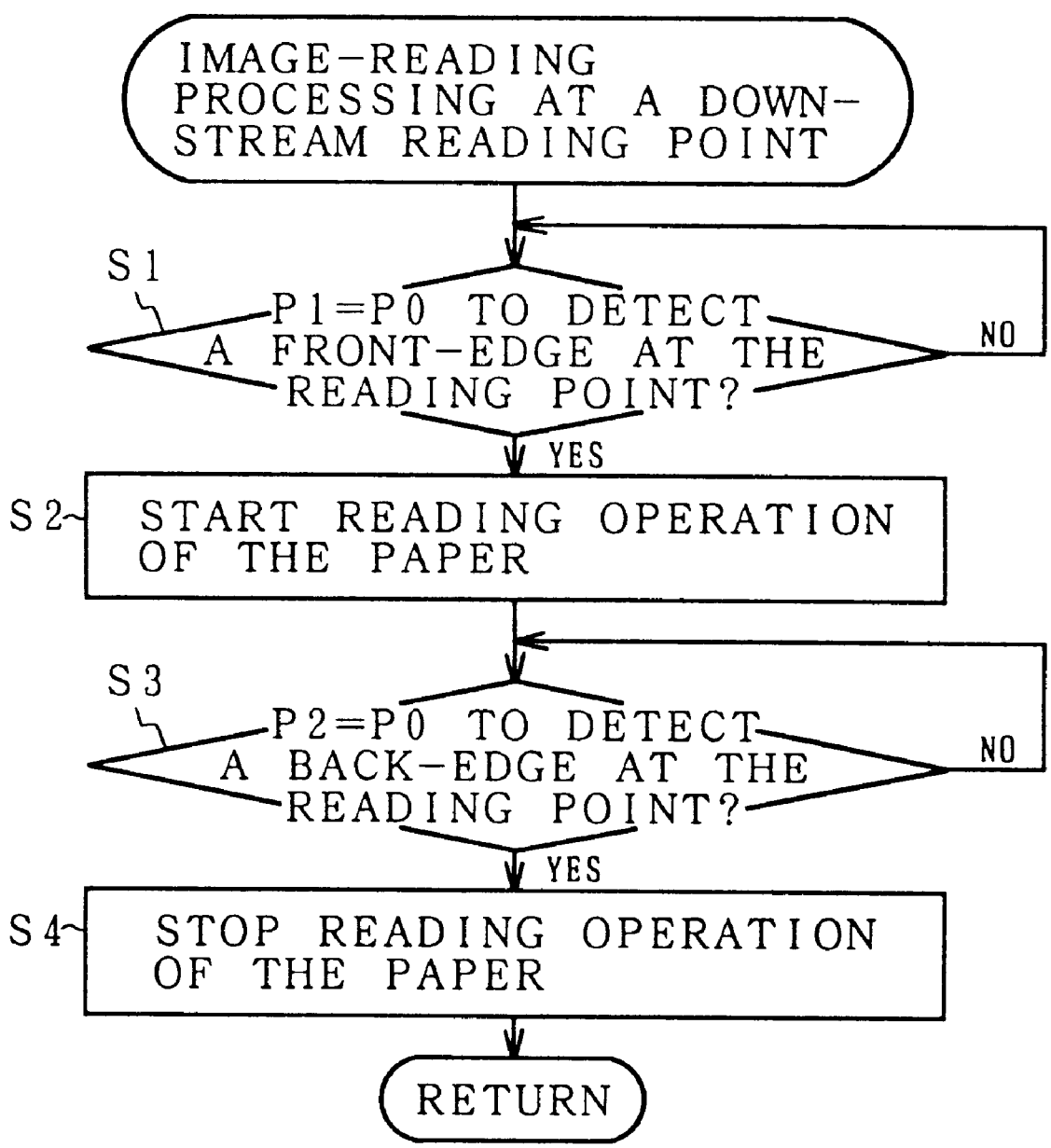
FIG. 26 is a flow chart of processing at a reading point based on the result of the correction shown in FIG. 25.

FIG. 26 is a flow chart of read processing in company with detection of the front and back edges of paper at the reading point based on the values counted by the front-edge counter P1 and back-edge counter P2 after correction shown in FIG. 25. First, at step S1, whether the value counted by the front-edge counter P1 after correction reaches the number of transfer pulses P0 from the sensor position to the reading point is tested. If the value reaches the number of transfer pulses P0, it is decided to be arrival of the front-edge of the paper to the reading point, and, reading of the paper is started at step S2. Subsequently, whether the value counted by the back-edge counter P2 after correction reaches the number of transfer pulses P0 from the sensor position to the reading point is tested at step S3. If the value reaches the number of transfer pulses, P0, it is decided to be arrival of the back-edge of the paper to the reading point, and, reading of the paper is stopped at step S4.

Figure 27:
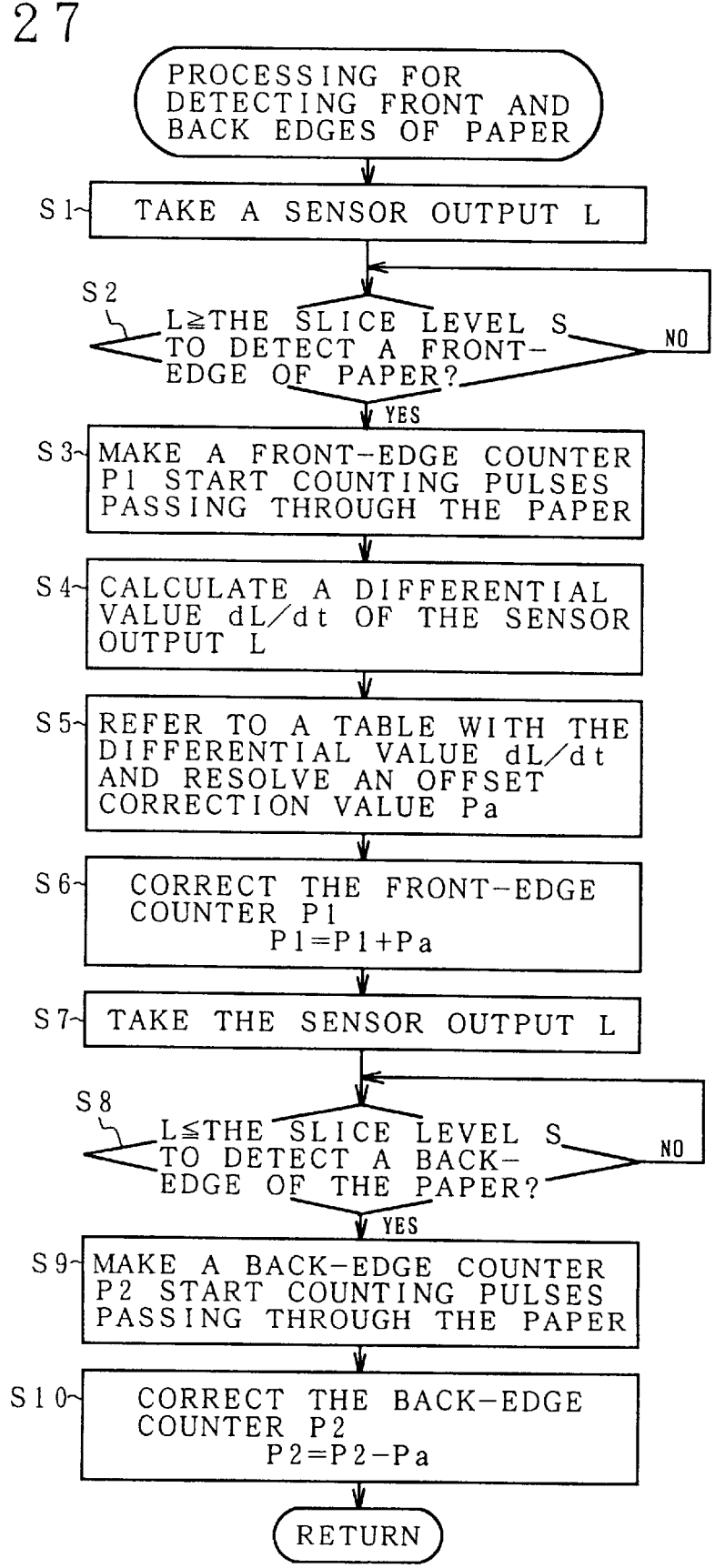
FIG. 27 is a flow chart of paper detection and offset correction using a derivative value obtained by the paper pass detection processing unit for the reflection-type sensor shown in FIG. 5.

FIG. 27 is a flow chart showing another implementation form of changing rate detection at the time when the sensor output L of the reflection-type sensor 48, as shown in FIG. 21, reaches the slice level S by the front-edge of the paper passing. Detection of the changing rate of the sensor output in this detection processing of the front and back edges of paper is characterized in that the changing rate is obtained by differentiating the sensor output. That is, when the sensor output L reaches at step S2 the slice level S in company with the front-edge of the paper passing, counting of the front-edge counter P1 is started, and, in the same time, the derivative value dL/dt of the sensor output at that time is calculated at step S4. And, by referring to the table information shown in FIG. 28, which beforehand stored the offset value Pa, using this derivative value, the corresponding offset value Pa is resolved. Processing except it is similar to that in the flow chart shown in FIG. 25. Of course, image-reading processing at the downstream reading point based on the values counted by the front-edge counter P1 and back-edge counter P2 after correction is also similar to that in the flow chart shown in FIG. 26.

Double-Feed Detection of the Reflection-type Sensor

FIGS. 29A–29C are explanatory drawings of detection processing by the double-feed detection processing unit 110 provided in the reflection-type sensor processing unit 102 shown in FIG. 5. First, the decision range setting unit 150, as shown in FIG. 29A, sets the upper limit and lower limit of the double-feed decision range that is compared with the counted result of pulses passing through the second sheet of paper, P1 based on the number of transfer-pass pulses, P0 at the time of detecting the first sheet of paper. The upper limit of the double-feed decision range, as shown in FIG. 29B, is (P0+α) that is obtained by adding the predetermined allowance α to the number of transfer-pass pulses, P0 at the time of the first sheet of paper. The lower limit, as shown in FIG. 29C, is (P0–α) that is obtained by subtracting the predetermined allowance α from the number of transfer-pass pulses, P0 at the time of the first sheet of paper.

FIGS. 30A–30D show decision processing by the double-feed decision unit 152 shown in FIG. 5 in the case that double-feed arises at the second sheet of paper. In the double-feed at the second sheet of paper, as shown in FIG. 30C, two sheets of paper 18-2 and 18-3 are double-fed. Owing to this, the number of pulses passing through the paper, P1 indicating the paper detection shown in FIG. 30A exceeds the upper limit of the double-feed decision range, (P0+α) shown in FIG. 30B. At the time of exceeding (P0+α), as shown in FIG. 30D, the double-feed decision signal rises from the level L to the level H.

FIGS. 31A–31D show another decision processing by the double-feed decision unit 152 shown in FIG. 5 in the case that double-feed arises at the first sheet of paper. That is, as shown in FIG. 31C, double-feed of the paper 18-1 and 18-2 arises at the transfer of the first sheet of paper. Consequently, the number of transfer-pass pulses, P0, which becomes a reference of the double-feed decision range, becomes longer than the actual length of the paper 18-1. On the other hand, the lower limit of the double-feed decision range shown in FIG. 31B is (P0–α) that is obtained by subtracting the allowance α from the number of transfer-pass pulses, P0 at the time of the first sheet of paper. Owing to this, the lower limit of the double-feed decision range exceeds the length of the second sheet of paper 18-3. Therefore, the number of transfer-pass pulses, P1 at the time of the second sheet of paper 18-3 passing, that is, the time of detecting the back-edge of the paper does not reach the lower decision limit, (P0−α) shown in FIG. 31B. Hence, at this time, the double-feed decision signal rises from the level L to the level H, and therefore, double-feed at the time of transferring the first sheet of paper is detected.

FIG. 32 is a flow chart of double-feed decision processing by the double-feed detection processing unit 110 provided in the reflection-type sensor processing unit 102 shown in FIG. 5. First, at step S1, the pulses passing through the first sheet of paper, P0 is detected. Subsequently, at step S2, since the allowance α, which is used for setting the upper and lower limits of the error range of the double-feed decision, is predetermined as a plurality of allowances α1, α2, . . . ,αn according to kinds, friction coefficients, printed conditions, and the like, the optimum allowance αi is selected among these allowances. Then, at step S3, the upper limit of the double-feed decision range (P0+αi) and the lower decision limit (P0−αi) are set.

FIG. 33 is a flow chart of double-feed decision processing by the double-feed detection processing unit 110 provided in the reflection-type sensor processing unit 102 shown in FIG. 5. First, at step S1, the pulses passing through the paper, P1 in company with the second and later sheets of paper passing is detected, and the number of pulses passing through the paper, P1 is compared with the upper limit (P0+α) at step S2. If the number of pulses passing through the paper, P1 exceeds the upper limit, the process goes to step S3 to decide double-feed of the paper presently passing. In addition, if the number of pulses passing through the paper, P1 is not larger than the upper limit, the process goes to step S4 to compare it with the lower limit (P0−α). If the number of pulses passing through the paper, P1 is smaller than the lower limit, the process goes to step S5 to decide double-feed of the first sheet of paper. If double-feed is decided at step S3 or S5, the process goes to step S6 to perform error handling and error display. The error handling includes stopping feed of paper from the hopper at the time of deciding the double-feed, and discharging the paper presently being transferred to the stacker and stopping the transfer operation. As for the error display, the double-feed is displayed in the status of discriminating whether it is the double-feed of the paper presently passing at step S3 or the double-feed of the first sheet of paper at step S5.

As described above, according to the present invention, by providing different kinds of sensors for detecting paper on a paper transfer path, and selecting a sensor corresponding to various kinds of paper, it is possible to enhance the accuracy of paper detection and to securely detect double-feed without missing. Concretely, by providing a transmission-type sensor and a reflection-type sensor for detecting the same paper, and selecting processing by either sensor according to kinds of the paper, it is possible to enhance the accuracy of paper detection and to securely detect double-feed. In the paper detection by the reflection-type sensor, by setting the decision level of paper presence to be the range of 90%–95% of the sensor saturation output that exceeds the sensor level of the thinnest sheet of paper that is available in the apparatus, detection of the front and back edges of the paper is certain even if the paper is the thin sheet of paper having small attenuated quantity of transmitted light. In addition, in the paper detection by the transmission-type sensor, by obtaining the criterion-level for double-feed decision corresponding to the quantity of light transmitted from the base color portion of paper at the time of transferring the first sheet of paper using control of the light emission current, and deciding double-feed in the transfer of the second and later sheets of paper by setting the upper and lower limits based on the criterion-level for double-feed decision obtained at the time of the first sheet of paper, the double-feed decision range suitable to the actual paper, base color, and quantity of transmitted light is learned and set, and double-feed can be securely decided even if the paper to be used has various thickness, printed conditions, and base color. Furthermore, in the paper detection by the reflection-type sensor, by obtaining the offset by shifted detection from the changing rate of the sensor output at the time of detecting the front-edge of the paper, and correcting the value of position detection at the downstream reading point using this offset, it is possible to control processing such as read processing in the downstream side by paper detection suppressing the position shift of the front and back edges of the paper, which is peculiar to the reflection-type sensor, at the minimum, and thereby having high accuracy. Further, in the double-feed detection by the reflection-type sensor, by setting the decision range by adding and subtracting the allowance for the double-feed on the basis of the number of pulses passing through the first sheet of paper, and detecting the number of pulses passing through the paper, which goes out of range, in regard to the second and later sheets of paper, double-feed can be securely detected. In addition, by providing a plurality of allowances for setting the double-feed decision range by adding and subtracting them to/from the number of pulses passing through the first sheet of paper, and selecting an optimum allowance among them, it is possible to perform the optimum double-feed decision and securely to perform double-feed detection even if the paper to be used has different thickness, size, base color, printed color, printing method, edge treatment conditions, binding hole, friction coefficient by coating, and the like.

In addition, although the control of paper transfer is exemplified as the above implementation forms, the present invention is not limited to this, these forms can be applied, as it is, to the control of paper transfer performing suitable processing to paper during paper transfer in a printer, a facsimile, and the like. Further, although, in the above implementation forms, the case that a transmission-type sensor and a reflection-type sensor are used by switching and selection is exemplified, the independent control of paper transfer by each of the transmission-type sensor and reflection-type sensor can also be available. Furthermore, the present invention is not limited by the numbers written in these implementation forms.

What is claimed is:

1. A paper transfer control apparatus used for optical image reading apparatus that detects paper, which is transferred by a transfer mechanism, using one or more sensors, and optically reads an image on the paper, the paper transfer control apparatus comprising:

a transmission-type sensor detecting the paper;

a reflection-type sensor detecting the paper;

a sensor mode selecting unit for selecting one of said sensors;

a transmission-type sensor processing unit performing paper detection processing for said transmission-type sensor, based on a detection signal of the transmission-type sensor when selected by said sensor mode selecting unit; and a reflection-type sensor processing unit performing paper detection processing for said reflection-type sensor, based on a detection signal of the reflection-type sensor when selected by said sensor mode selecting unit, wherein each of said transmission-type sensor processing unit and said reflection-type sensor processing unit comprises:
- a paper pass detection processing unit for detecting information regarding paper pass from change of sensor detection levels regarding front and back edges of the paper; and
- a double-feed detection processing unit for detecting double-feed of paper based on the sensor detection level, wherein said double-feed detection processing unit of said transmission-type sensor processing unit comprises:
- a criterion-level setting unit for obtaining a sensor output L at the time of transferring the first sheet of paper in a criterion-level setting range having an upper limit Lup and a lower limit Ldown based on a quantity of light transmitted from a base color portion of paper by controlling light emission current of a sensor, detecting a sensor output corresponding to the quantity of light transmitted from the base color portion of the paper within the criterion-level setting range, and setting a criterion-level for double-feed decision, L0; and
- a double-feed decision unit for setting a lower decision limit Lr1 and an upper decision limit Lr2 based on the criterion-level for double-feed decision, L0 that is set by said criterion-level setting unit, deciding to be double-feed of paper presently being transferred if the sensor output L becomes equal to or lower than said lower decision limited Lr1 when the second and later sheets of paper are transferred, and deciding to be double-feed of the first sheet of paper if the sensor output L becomes equal to or larger than said upper decision limit Lr2.

2. A paper transfer control apparatus according to claim 1, wherein said criterion-level setting unit detains the sensor output in said criterion-level setting range by decreasing light emission current of a sensor if the sensor output at the time of a front-edge of paper passing is not smaller than said upper limit Lup, and pulls a sensor output in said criterion-level setting range by increasing light emission current of the sensor if the sensor output at the time of a front-edge of paper passing is not larger than said lower limit Ldown.

3. A paper transfer control apparatus according to claim 2, wherein said criterion-level setting unit increases a changing speed at the time of decreasing light emission current of a sensor, and on the contrary, decreases the changing speed at the time of increasing the light emission current of the sensor.

4. A paper transfer control apparatus according to claim 1, wherein said criterion-level setting unit inhibits control of light emission current for pulling a sensor output in said criterion-level setting range until a counted value of pulses passing through paper since detection of a front-edge of the paper reaches a predetermined value.

5. A paper transfer control apparatus according to claim 1, wherein said criterion-level setting unit starts peak hold of a sensor output in a status that control of light emission current is stopped, when the sensor output is pulled in said criterion-level setting range continuously during a predetermined period, and sets a peak hold value just before detecting a back-edge of paper as a criterion-level for double-feed decision, L0.

6. A paper transfer control apparatus according to claim 5, wherein said criterion-level setting unit restarts control of light emission current and also inhibits peak hold if a sensor output goes out of said criterion-level setting range during the peak hold after said criterion-level setting unit pulled the sensor output in said criterion-level setting range.

7. A paper transfer control apparatus according to claim 5, wherein said double-feed decision unit sets a period from the time of detecting a front-edge of paper to the time of counting a number of pulses passing through the first sheet of paper, P0, which was obtained beforehand, as a double-feed decision period.

8. A paper transfer control apparatus according to claim 7, wherein said double-feed decision unit inhibits double-feed decision during a period when first predetermined number of pulses passing through paper, Pa is counted, in said double-feed decision period.

9. A paper transfer control apparatus according to claim 1, wherein said double-feed decision unit decides to be double-feed of paper presently passing, if a number of pulses passing through the paper since a front-edge of the paper was detected exceeds a value, $(P0+\alpha)$ obtained by adding a first number of pulses passing through the paper, P0, which was obtained beforehand, and a predetermined error range $\alpha$, and even if a sensor output is within a range between said lower limit Lr1 and said upper limit Lr2 of double-feed decision.

10. A paper transfer control apparatus used for optical image reading apparatus that detects paper, which is transferred by a transfer mechanism, using one or more sensors, and optically reads an image on the paper, the paper transfer control apparatus comprising:
- a transmission-type sensor detecting the paper;
- a reflection-type sensor detecting the paper;
- a sensor mode selecting unit for selecting one of said sensors;
- a transmission-type sensor processing unit performing paper detection processing for said transmission-type sensor, based on a detection signal of the transmission-type sensor when selected by said sensor mode selecting unit; and
- a reflection-type sensor processing unit performing paper detection processing for said reflection-type sensor, based on a detection signal of the reflection-type sensor when selected by said sensor mode selecting unit, wherein each of said transmission-type sensor processing unit and said reflection-type sensor processing unit comprises:
- a paper pass detection processing unit for detecting information regarding paper pass from change of sensor detection levels regarding front and back edges of the paper; and
- a double-feed detection processing unit for detecting double-feed of paper based on the sensor detection level, wherein said paper pass detection processing unit of said reflection-type sensor processing unit obtains an offset value Pa from a front-edge of the paper, when a sensor output reaches a slice level S, using a changing rate at the time of the sensor output reaching said predetermined slice level S after the front-edge of the paper passing, and corrects a value used for decision at the time of the front-edge of the paper reaching a reading point in a down-flow side, using the offset value Pa.

11. A paper transfer control apparatus according to claim 10, wherein a paper pass detection processing unit of said reflection-type sensor processing unit prepares relation between said changing rate and an offset value Pa beforehand as table information.

12. A paper transfer control apparatus according to claim 10, wherein a paper pass detection processing unit of said reflection-type sensor processing unit uses a differential (Lt−S), which is obtained by subtracting a predetermined slice level S from a sensor output Lt at the time when a predetermined number of pulses passing through paper, Pd from the time when the sensor output reached the slice level S is counted, as a changing rate at the time when the sensor output reaches the predetermined slice level S after a front-edge of paper passed.

13. A paper transfer control apparatus according to claim 10, wherein a paper pass detection processing unit of said reflection-type sensor processing unit uses a derivative value of a sensor output, dL/dt at the time when the sensor output reaches the slice level S, as a changing rate at the time when the sensor output reaches the predetermined slice level S after a front-edge of paper passed.

14. A paper transfer control apparatus according to claim 10, wherein a paper pass detection processing unit of said reflection-type sensor processing unit makes a front-edge counter P1 start counting pulses passing through paper at the time when a sensor output increases to a predetermined slice level S after a front-edge of paper passed, corrects the count by adding said offset correction value Pa, and decides arrival of the front-edge of the paper to a reading point when a counted value of the front-edge counter P1 after the correction reaches a predetermined number of pulses passing through the paper, P0 from a sensor position to the reading point.

15. A paper transfer control apparatus according to claim 10, wherein a paper pass detection processing unit of said reflection-type sensor processing unit makes a back-edge counter P2 start counting pulses passing through paper at the time when a sensor output decreases to a predetermined slice level S just before the back-edge of the paper passes, corrects the count by subtracting said offset correction value Pa, and decides arrival of the back-edge of the paper to a reading point when a counted value of the back-edge counter P2 after the correction reaches a predetermined number of pulses passing through the paper, P0 from a sensor position to the reading point.

16. A transfer control apparatus used for optical image reading apparatus that detects paper, which is transferred by a transfer mechanism, using one or more sensors, and optically reads an image on the paper, the paper transfer control apparatus comprising:

a transmission-type sensor detecting the paper;

a reflection-type sensor detecting the paper;

a sensor mode selecting unit for selecting one of said sensors;

a transmission-type sensor processing unit performing paper detection processing for said transmission-type sensor, based on a detection signal of the transmission-type sensor when selected by said sensor mode selecting unit; and a reflection-type sensor processing unit performing paper detection processing for said reflection-type sensor, based on a detection signal of the reflection-type sensor when selected by said sensor mode selecting unit, wherein each of said transmission-type sensor processing unit and said reflection-type sensor processing unit comprises:

a paper pass detection processing unit for detecting information regarding paper pass from change of sensor detection levels regarding front and back edges of the paper; and a double-feed detection processing unit for detecting double-feed of paper based on the sensor detection level, wherein said double-feed detection processing unit of said transmission-type sensor processing unit comprises:

a decision range setting unit for setting an upper limit (P0+α) and a lower limit (P0−α) by adding and subtracting a predetermined error range α to/from a number of pulses passing through the paper from a front-edge of the paper to a back-edge, P0, which were detected at the time when the first sheet of the paper was transferred; and a double-feed decision unit for deciding to be double-feed of paper presently passing, if a counted value of pulses passing through the paper at the time when the second or later sheet of paper is transferred exceeds said upper limit (P0+α), and deciding to be the double-feed of the first sheet of paper, if the counted value becomes smaller than said lower limit (P0−α).

17. A paper transfer control apparatus according to claim 16, wherein said decision range setting unit sets said error allowance α to be variable, if necessary.

18. A paper transfer control apparatus used for optical image reading apparatus that detects paper, which is transferred by a transfer mechanism, using a transmission-type sensor, and optically reads an image on the paper, the paper transfer control apparatus comprising:

a paper pass detection processing unit for detecting information regarding paper pass from change of sensor detection levels at front and back edges of the paper; and a double-feed detection processing unit for detecting double-feed of the paper based on a sensor detection level, wherein said double-feed detection processing unit comprises:

a criterion-level setting unit for pulling a sensor output L in a criterion-level setting range having an upper limit Lup and a lower limit Ldown based on a quantity of light transmitted from a base color portion of the paper when the first sheet of paper is transferred, detecting a sensor output corresponding to the quantity of light transmitted from the base color portion of the paper within the criterion-level setting range, and setting the sensor output as a criterion level for double-feed decision, L0; and a double-feed decision unit for setting a lower decision limit Lr1 and an upper decision limit Lr2 based on the criterion-level for double-feed decision, L0 set by said criterion-level setting unit, deciding to be double-feed of paper presently transferred if a sensor output at the time when the second and later sheets of paper are transferred is not larger than said lower limit Lr1, and setting to be double-feed of the first sheet of paper if the sensor output is not smaller than said upper limit Lr2.

19. A paper transfer control apparatus according to claim 18, wherein said criterion-level setting unit pulls a sensor output in said criterion-level setting range by decreasing light emission current of a sensor if the sensor output is equal to or larger than said upper limit Lup, and pulls a sensor output in said criterion-level setting range by increasing the light emission current of the sensor if the sensor output is equal to or smaller than said lower limit Ldown.

20. A paper transfer control apparatus according to claim 18, wherein said criterion-level setting unit increases a changing speed at the time of decreasing light emission current of a sensor, and on the contrary, decreases the changing speed at the time of increasing the light emission current of the sensor.

21. A paper transfer control apparatus according to claim 18, wherein said criterion-level setting unit inhibits control of light emission current for pulling a sensor output in said criterion-level setting range until a counted value of pulses passing through paper since detection of a front-edge of the paper reaches a predetermined value.

22. A paper transfer control apparatus according to claim 18, wherein said criterion-level setting unit starts peak hold of a sensor output in a status that control of light emission current is stopped, when the sensor output is pulled in said criterion-level setting range continuously during a predetermined period, and sets a peak hold value just before detecting a back-edge of paper as a criterion-level for double-feed decision, L0.

23. A paper transfer control apparatus according to claim 22, wherein said criterion-level setting unit restarts control of light emission current and also inhibits peak hold if a sensor output goes out of said criterion-level setting range during the peak hold after said criterion-level setting unit pulled the sensor output in said criterion-level setting range.

24. A paper transfer control apparatus according to claim 18, wherein said double-feed decision unit sets a period from the time of detecting a front-edge of paper to the time of counting a number of pulses passing through the first sheet of paper, P0, which was obtained beforehand, as a double-feed decision period.

25. A paper transfer control apparatus according to claim 24, wherein said double-feed decision unit inhibits double-feed decision during a period when a first predetermined number of pulses passing through paper, Pa is counted, in said double-feed decision period.

26. A paper transfer control apparatus according to claim 18, wherein said double-feed decision unit further decides to be double-feed of paper presently passing, if a number of pulses passing through the paper since a front-edge of the paper was detected exceeds a value (P0+α) obtained by adding a first number of pulses passing through the paper, P0, which was obtained beforehand, and a predetermined error range α, and even if a sensor output is within a range between said lower limit Lr1 and said upper limit Lr2 of double-feed decision.

27. A paper transfer control apparatus used for optical image reading apparatus that detects paper, which is transferred by a transfer mechanism, using a reflection-type sensor, and optically reads an image on the paper, the paper transfer control apparatus comprising:

a paper pass detection processing unit for detecting information regarding paper pass from change of sensor detection levels at front and back edges of the paper; and a double-feed detection processing unit for detecting double-feed of paper based on a sensor detection level, wherein said paper pass detection processing unit obtains an offset value Pa from a front-edge of the paper, when a sensor output reaches a slice level S, using a changing rate at the time of the sensor output reaching said predetermined slice level S after the front-edge of the paper passing, and corrects a value used for decision at the time of the front-edge of the paper reaching a reading point in a down-flow side, using the offset value Pa.

28. A paper transfer control apparatus according to claim 27, wherein a paper pass detection processing unit of said reflection-type sensor processing unit prepares relation between said changing rate and an offset value Pa beforehand as table information.

29. A paper transfer control apparatus according to claim 27, wherein a paper pass detection processing unit of said reflection-type sensor processing unit uses a differential (Lt−S), which is obtained by subtracting a predetermined slice level S from a sensor output Lt at the time when a predetermined number of pulses passing through paper, Pd from the time when the sensor output reached the slice level S is counted, as a changing rate at the time when the sensor output reaches the predetermined slice level S after a front-edge of paper passed.

30. A paper transfer control apparatus according to claim 27, wherein a paper pass detection processing unit of said reflection-type sensor processing unit uses a derivative value of a sensor output, dL/dt at the time when a sensor output reaches a slice level S, as a changing rate at the time when the sensor output reaches the predetermined slice level S after a front-edge of paper passed.

31. A paper transfer control apparatus according to claim 27, wherein a paper pass detection processing unit of said reflection-type sensor processing unit makes a front-edge counter P1 start counting pulses passing through paper at the time when a sensor output increases to a predetermined slice level S after a front-edge of paper passed, corrects the count by adding said offset correction value Pa, and decides arrival of the front-edge of the paper to a reading point when a counted value of the front-edge counter P1 after the correction reaches a predetermined number of pulses passing through the paper, P0 from a sensor position to the reading point.

32. A paper transfer control apparatus according to claim 27, wherein a paper pass detection processing unit of said reflection-type sensor processing unit makes a back-edge counter P2 start counting pulses passing through paper at the time when a sensor output decreases to a predetermined slice level S just before a back-edge of paper passes, corrects the count by subtracting said offset correction value Pa, and decides arrival of the back-edge of the paper to a reading point when a counted value of the back-edge counter P2 after the correction reaches a predetermined number of pulses passing through the paper, P0 from a sensor position to the reading point.

33. A paper transfer control apparatus, used for optical image reading apparatus that detects paper, which is transferred by a transfer mechanism, using a reflection-type sensor, and optically reads an image on the paper, the paper transfer control apparatus comprising:

a paper pass detection processing unit for detecting information regarding paper pass from change of sensor detection levels at front and back edges of paper; and a double-feed detection processing unit for detecting double-feed of paper based on a sensor detection level, wherein said double-feed detection processing unit comprises:

a decision range setting unit for setting an upper limit (P0+α) and a lower limit (P0−α) by adding and subtracting a predetermined error range α to/from a number of pulses passing through the paper from a front-edge of the paper to a back-edge, P0, which were detected at the time when the first sheet of the paper was transferred; and a double-feed decision unit for deciding to be double-feed of paper presently passing, if a counted value of pulses passing through the paper at the time when the second or later sheet of paper is transferred exceeds said upper limit (P0+α), and deciding to be double-feed of the first sheet of paper, if the counted value becomes smaller than said lower limit (P0−α).

34. A paper transfer control apparatus according to claim 33, wherein said decision range setting unit sets said error allowance α to be variable, if necessary.

* * * * *